(12) United States Patent
Moore et al.

(10) Patent No.: US 8,628,040 B2
(45) Date of Patent: *Jan. 14, 2014

(54) AIRCRAFT CONFIGURATION

(75) Inventors: Matthew D. Moore, Everett, WA (US); Kelly L. Boren, Marysville, WA (US); Edward C. Marques, Issaquah, WA (US); Justin Lan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 332 days.

This patent is subject to a terminal disclaimer.

(21) Appl. No.: 13/093,596

(22) Filed: Apr. 25, 2011

(65) Prior Publication Data

US 2012/0091270 A1 Apr. 19, 2012

Related U.S. Application Data

(63) Continuation-in-part of application No. 11/307,271, filed on Jan. 30, 2006, now Pat. No. 8,016,233.

(51) Int. Cl.
*B64C 1/40* (2006.01)
*B64C 23/00* (2006.01)

(52) U.S. Cl.
USPC ............ 244/1 N; 244/117 R; 244/54; 244/55; 244/119

(58) Field of Classification Search
USPC ..... 244/54, 55, 119, 129.1, 45 R, 117 R, 4 R, 244/1 N; 181/213, 296
See application file for complete search history.

(56) References Cited

U.S. PATENT DOCUMENTS

| | | |
|---|---|---|
| 2,390,859 A | 12/1945 | Warner |
| 2,469,619 A | 5/1949 | Warner |
| 2,846,165 A | 8/1958 | Axelson |
| 2,863,620 A | 12/1958 | Vautier |
| 3,310,262 A | 3/1967 | Robins et al. |

(Continued)

FOREIGN PATENT DOCUMENTS

GB  1243392  8/1971

OTHER PUBLICATIONS

Meyer Reshotko, Jack H. Goodykoontz and Robert G. Dorsch, "Engine-Over-the-Wing Noise Research", J. Aircraft, Apr. 1974, pp. 195-196, vol. 11, No. 4.

(Continued)

*Primary Examiner* — Philip J Bonzell
(74) *Attorney, Agent, or Firm* — Matthew W. Witsil; Moore & Van Allen PLLC

(57) ABSTRACT

An aircraft configuration that may reduce the level of roaring jet exhaust noise, infrared radiation, sonic boom, or combination thereof directed towards the ground from an aircraft in flight. The aircraft's nacelles are mounted to the aircraft higher than the wings, with substantially vertical stabilizers outboard of the outermost engine. Noise shifting means are provided such as, for each nacelle, primary chevrons at the core nozzle, secondary chevrons at the fan nozzle, a partial bypass mixer, a long duct full flow mixer, or a combination thereof to provide a shift in spectrum distribution of jet exhaust noise from lower to higher frequency. Variable geometry chevrons may be used with increased immersion to provide such a shift just during noise-restricted portions of an aircraft flight profile. The aircraft aerodynamic structural surfaces serve as noise shielding barriers that more effectively block or redirect the frequency shifted noise up and away from communities.

20 Claims, 21 Drawing Sheets

(56) References Cited

U.S. PATENT DOCUMENTS

| | | | |
|---|---|---|---|
| 3,576,300 | A | 4/1971 | Palfreyman |
| 3,727,862 | A | 4/1973 | Kaufhold et al. |
| 3,830,451 | A | 8/1974 | Fosness |
| 3,936,017 | A | 2/1976 | Blythe et al. |
| 4,019,699 | A | 4/1977 | Wintersdorff et al. |
| 4,036,452 | A | 7/1977 | Schairer |
| 4,093,156 | A | 6/1978 | Coe, Jr. |
| 4,171,786 | A | 10/1979 | Krenz |
| 4,311,289 | A | 1/1982 | Finch |
| 4,447,022 | A | 5/1984 | Lion |
| 4,449,680 | A | 5/1984 | Gratzer et al. |
| 4,767,083 | A | 8/1988 | Koenig et al. |
| 4,828,203 | A | 5/1989 | Clifton et al. |
| 4,836,469 | A | 6/1989 | Wagenfeld |
| 5,034,751 | A | 7/1991 | Miller, Jr. |
| 5,348,256 | A | 9/1994 | Parikh |
| 5,495,999 | A | 3/1996 | Cymara |
| 5,529,263 | A | 6/1996 | Rudolph |
| 5,738,298 | A | 4/1998 | Ross et al. |
| 5,842,666 | A | 12/1998 | Gerhardt et al. |
| 5,899,409 | A | 5/1999 | Frediani |
| 6,102,328 | A | 8/2000 | Kumata et al. |
| 6,308,913 | B1 | 10/2001 | Fujino et al. |
| 6,532,729 | B2 | 3/2003 | Martens |
| 6,575,406 | B2 | 6/2003 | Nelson |
| 6,718,752 | B2 | 4/2004 | Nesbitt et al. |
| 6,817,571 | B2 | 11/2004 | Retz et al. |
| 6,824,092 | B1 | 11/2004 | Franklin, III et al. |
| 6,843,450 | B2 | 1/2005 | Bath et al. |
| 6,921,045 | B2 | 7/2005 | Chang et al. |
| 6,929,216 | B2 | 8/2005 | Bath et al. |
| 7,546,977 | B2 * | 6/2009 | Morgenstern ............... 244/35 A |
| 7,762,057 | B2 | 7/2010 | Sloan et al. |
| 7,900,865 | B2 * | 3/2011 | Moore et al. ............... 244/1 N |
| 2003/0052228 | A1 | 3/2003 | Sankrithi |
| 2004/0007647 | A1 | 1/2004 | Dong et al. |
| 2006/0157613 | A1 * | 7/2006 | Adamson et al. ............ 244/1 N |
| 2007/0023571 | A1 | 2/2007 | Kawai et al. |
| 2007/0252028 | A1 * | 11/2007 | Morgenstern ................ 244/1 N |
| 2011/0030380 | A1 | 2/2011 | Widdle, Jr. et al. |

OTHER PUBLICATIONS

"Noise-Reduction Benefits Analyzed for Over-the-Wing-Mounted Advanced Turbofan Engine (Synopsis)", www-psao.grc.nasa.gov/Library/Abstracts/berton6.html, Jan. 20, 2006, pp. 1-2.

Mizrahi, "Flight to the Future", Jan. 20, 2006, www.twitt.org/bldwing.htm, pp. 1-9.

"Stealth Aircraft: the technology behind the planes", www.seorf.ohiou.edu, Jan. 20, 2006, pp. 1-12.

Geoffrey A. Hill and Russell H. Thomas, "Challenges and Opportunities for Noise Reduction Through Advanced Aircraft Propulsion Airframe Integration and Configurations", 8th CEAS Workshop: Aeroacoustics of New Aircraft and Engine Configurations, Budapest, Hungary, 2004, pp. 1-13.

Matthew D. Moore, et al., U.S. Appl. No. 11/612,594; non-final Office Action, dated Jan. 26, 2009.

Matthew D. Moore, et al., U.S. Appl. No. 11/612,594; final Office Action, dated Oct. 13, 2009.

Matthew D. Moore, et al., U.S. Appl. No. 11/612,594; Advisory Action, dated Dec. 29, 2009.

Matthew D. Moore, et al., U.S. Appl. No. 11/612,594; non-final Office Action, dated Mar. 17, 2010.

Matthew D. Moore, et al., U.S. Appl. No. 11/612,594; final Office Action, dated Aug. 10, 2010.

James H. Mabe, Frederick T. Calkins and George W. Butler, Boeing's Variable Geometry Chevron, Morphing Aerostructure for Jet Noise Reduction, American Institute of Aeronautics and Astronautics, 47th AIAA/ASME/ASCE/AHS/ASC Structures, Structural Dynamics, and Materials Conference, May 1-4, 2006, pp. 1-19.

Vinod G. Mengle, Jet Noise Characteristics of Chevrons in Internally Mixed Nozzles, American Institute of Aeronautics and Astronautics, 11th AIAA/CEAS Aeroacoustics Conference (26th AIAA Aeroacoustics Conference), May 23-25, 2005, pp. 1-15.

* cited by examiner

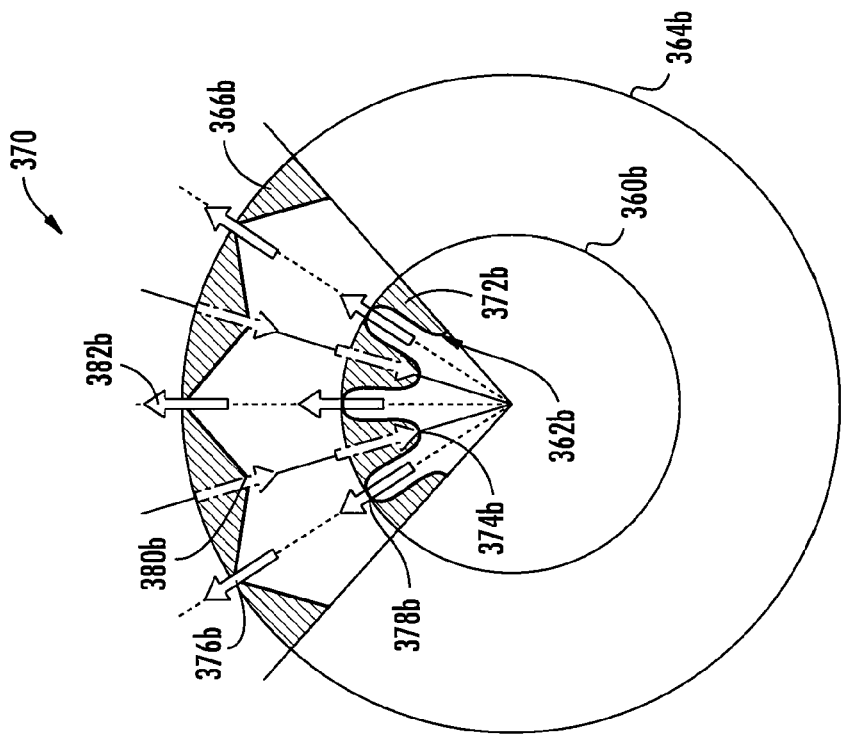
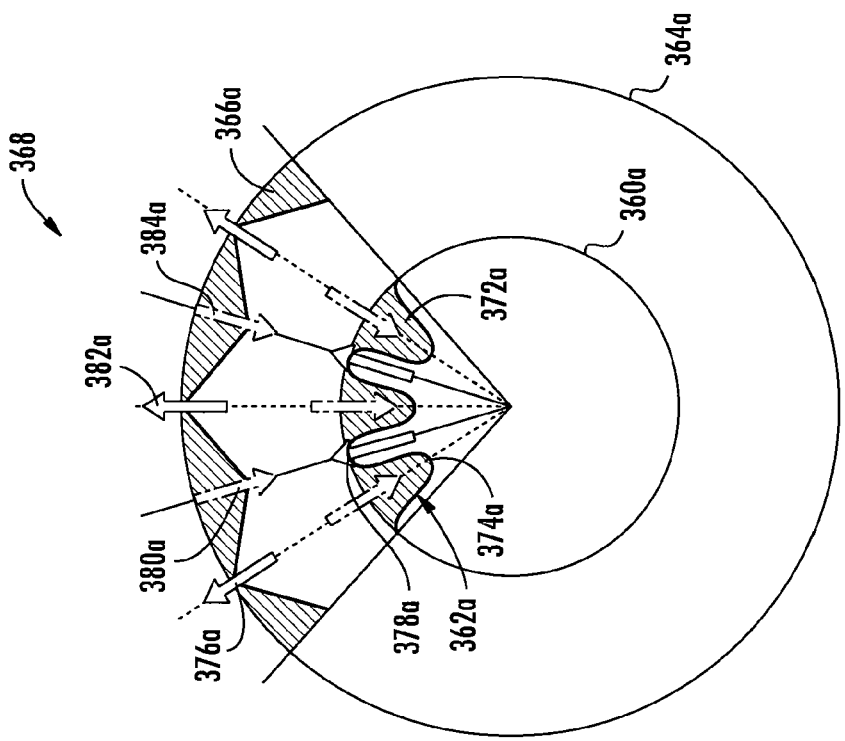

AIRCRAFT CONFIGURATION

CROSS-REFERENCE TO RELATED APPLICATION

This application is a continuation-in-part of co-pending U.S. patent application Ser. No. 11/307,271, entitled "Aircraft Configuration," filed Jan. 30, 2006, the contents of which are incorporated herein by reference in their entirety.

BACKGROUND

Aircraft engines generate sound and heat in their operation. Excessive sound is undesirable largely because of disturbance to surrounding communities. Heat is undesirable particularly in both military and civil aircraft, which may be tracked by ground-based missiles that seek heat in the form of infrared radiation. Heat is also undesirable because it degrades aircraft surface structure and increases the cost of manufacture and maintenance. The design of the aircraft profoundly impacts the sound and heat that are observed from the ground.

Conventional subsonic civil aircraft designs commonly feature engine placement underneath the airplane's wings. Conventional supersonic military aircraft designs commonly feature engine placement in the aft-most portion of the airplane with the nozzles extending aft of the wing and control surfaces. The sound pressure level produced by the engines, herein generally referred to as noise, and particularly jet noise or the "roar" heard at takeoff, travels largely unabated to communities. For under-wing engine installations this noise is amplified by the under-surface of the wing because the portion of the sound produced by the engines that would otherwise radiate upward is reflected downward off of the under-surface. The jet plume interacts with the wing trailing edge. Both the under-surface reflection and the jet plume interaction with the wing trailing edge add to the overall noise heard below. Even when engines are located higher than wings, aircraft generally offer little in the way of impeding the downward travel of sound due to the absence of a surface that covers a substantial extent of the downward sound propagation path. Technological improvements in engines have resulted in a gradual reduction of engine noise over time, but further reductions based on similar improvements will likely be minimal.

Heat, in the form of infrared radiation, similarly radiates from aircraft engines and, unless otherwise shielded, will emit or reflect down and outward into directions that can be used by would-be threats to try and target aircraft operating in zones of armed conflict. Whether or not aircraft are fitted with protective countermeasures equipment, aircraft that project heat and noise toward the community don't offer any preventative deterrence against the would-be threat, such as interrupting the weapon targeting process. On production aircraft normally constrained by application of traditional commercial design practices for noise reduction, there has been varied interest and success gaining a comparable natural reduction in heat emissions without extra penalty or cost. The interests of military and special purpose aircraft operators and procurement officials continue to be focused on affordability and burdens for installed defensive systems for aircraft and crew protection, even though affordable design improvements with the starting point of the aircraft could be gratis and more enduring.

In the case of supersonic aircraft, the propulsion system also contributes to the sonic boom produced during supersonic flight. Reduction of sonic boom from typical levels is widely believed to be necessary for regulators to ever accept civil supersonic flight. The characteristic N-wave of a sonic boom is created both by shockwaves produced at the fore and aft regions of the aircraft. Strides have been made at reducing fore shocks. An appreciable reduction in sonic boom annoyance, however, cannot be realized without reduction of both fore and aft shocks, a portion of which is typically produced by the propulsion system.

SUMMARY

In accordance with an embodiment described herein, an aircraft includes a tubular fuselage, two delta wings, at least one engine mounted to the aircraft and higher than the wings, and vertical stabilizers mounted on each wing outboard of the outermost engine. Accordingly, embodiments described herein may reduce the level of noise, infrared radiation, or both directed towards the ground from an aircraft in flight.

In accordance with another embodiment described herein, an aircraft includes a tubular fuselage, two delta wings, each with a wing strake at the leading edge of the wing and extending to the fuselage, a plurality of engines mounted to the aircraft wholly above the wings, vertical stabilizers mounted on each wing outboard of the outermost engine, and an aft deck. Each vertical stabilizer extends at least as high as the central axis of the highest engine, at the lowest point of that engine, and the vertical stabilizers further extend from the leading edge to the trailing edge of the wing. The aft deck includes an upwardly rotatable pitch control surface at the trailing edge of the deck.

In accordance with another embodiment, a method of making an aircraft with reduced aircraft noise, infrared radiation, or both, emitted towards the ground from the aircraft in flight is provided. The method includes mounting an engine to the aircraft above a wing. The engine includes a nacelle and the wing extends forward of the inlet of the nacelle and aft of the exhaust of the nacelle a distance at least as great as the vertical distance between the upper surface of the wing and the top of the nacelle. An aft deck is provided that extends from the wing and includes a trailing edge extending aft of the exhaust of the nacelle a distance at least as great as the vertical distance between the upper surface of the wing and the top of the nacelle.

In accordance with another embodiment, a non-blended wing body aircraft is provided. The aircraft includes a tubular fuselage and two wings with two wing strakes mounted to the tubular fuselage. The wings and strakes are in a substantially delta wing configuration and each includes a leading edge and a top surface, and the wings each include a trailing edge. A plurality of nacelles is mounted to the fuselage that have a leading end, a top, a bottom, and a longitudinal axis, and each nacelle includes a turbofan engine, a fan nozzle having a diameter, and a core nozzle. Each nacelle is completely and directly above the respective wing, strake, or a combination thereof. A substantially vertical stabilizer is mounted on each wing outboard of each respective outermost nacelle at a mounting location. A split aft deck including a trailing edge is provided and there is a multi-element upwardly rotatable pitch control surface including a trailing edge at the trailing edge of the deck. Noise shifting means is provided that is associated with the core nozzle, the fan nozzle, or a combination thereof, of each nacelle. The mounting location of each substantially vertical stabilizer to the respective wing is lower than the bottom of the respective outermost nacelle and each substantially vertical stabilizer extends at least as high as the top of the respective outermost nacelle. The leading edge of each strake or wing, as applicable, extends forward of the respective nacelle leading end along the longitudinal axis of that nacelle at least a distance as great as the distance from the top surface of the respective wing to the top of the respective nacelle. The trailing edge of the aft deck extends aft of the respective nacelle fan nozzle along the longitudinal axis of that nacelle at least a distance as great as the distance from the top surface of the respective wing to the top of the respective nacelle. The fuselage extends between the nacelles and there is no central vertical stabilizer between the nacelles.

Noise shifting means may include, for example and for each nacelle, primary chevrons at the core nozzle, secondary chevrons at the fan nozzle, a partial bypass mixer at the core nozzle, a long duct full flow mixer at the core nozzle, or a combination thereof.

In another embodiment, a method is provided for making a non-blended wing body aircraft with reduced aircraft noise, infrared radiation, or sonic boom, or a combination thereof, emitted towards the ground from the aircraft in flight. The method includes providing a tubular fuselage and mounting two wings with two wing strakes to the fuselage, with the wings and strakes in a substantially delta wing configuration. The wings and strakes each include a leading edge and a top surface, and the wings each including a trailing edge. A plurality of nacelles is mounted to the fuselage that has a leading end, a top, a bottom, and a longitudinal axis. Each nacelle includes a turbofan engine, a fan nozzle having a diameter, and a core nozzle. Each nacelle is completely and directly above the respective wing, strake, or a combination thereof. A substantially vertical stabilizer is mounted on each wing outboard of each respective outermost nacelle at a mounting location, and a split aft deck is provided that includes a trailing edge and a multi-element upwardly rotatable pitch control surface, which includes a trailing edge at the trailing edge of the deck. Noise shifting means is providing for each nacelle, including one or more of primary chevrons at the core nozzle, secondary chevrons at the fan nozzle, a partial bypass mixer at the core nozzle, a long duct full flow mixer at the core nozzle, or a combination thereof. The mounting location of each substantially vertical stabilizer to the respective wing is lower than the bottom of the respective outermost nacelle and each substantially vertical stabilizer extends at least as high as the top of the respective outermost nacelle. The leading edge of each strake or wing, as applicable, extends forward of the respective nacelle leading end along the longitudinal axis of that nacelle at least a distance as great as the distance from the top surface of the respective wing to the top of the respective nacelle. The trailing edge of the aft deck extends aft of the respective nacelle fan nozzle along the longitudinal axis of that nacelle at least a distance as great as the distance from the top surface of the respective wing to the top of the respective nacelle. The fuselage extends between the nacelles and there is no central vertical stabilizer between the nacelles.

In another embodiment, a method is provided for shielding noise emitted towards the ground from a non-blended wing body aircraft in flight by nacelles, where each nacelle has a longitudinal axis and includes a turbofan engine, a fan nozzle having a diameter, and a core nozzle, and the aircraft includes aerodynamic structural surfaces. The method includes using noise shifting means associated with the fan nozzle, the core nozzle, or a combination thereof, to cause an increase in high frequency noise and a decrease in low frequency noise. The aerodynamic structural surfaces are used as a noise shielding barrier between the nacelles and the ground. The barrier has a trailing end that extends aft of the fan nozzle between approximately two and approximately four fan nozzle diameters from the fan nozzle along the nacelle longitudinal axis.

The features, functions, and advantages can be achieved independently in various embodiments of the present invention or may be combined in yet other embodiments.

BRIEF DESCRIPTION OF DRAWINGS

FIGS. 27 and 28 are simplified schematic cross-section views of a nacelle with different relative angular orientations of lobes of a forced mixer and secondary chevrons, and their noise performance.

DETAILED DESCRIPTION

Figure 1:
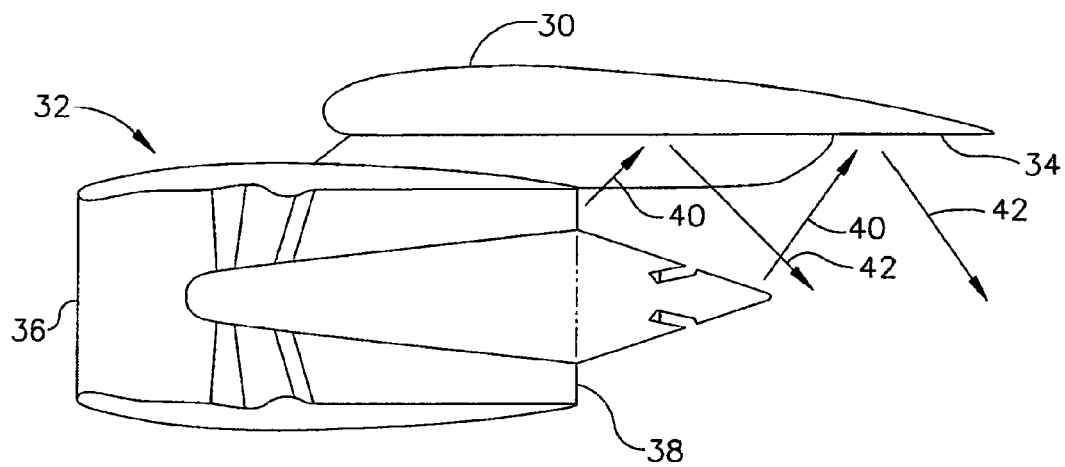
FIG. 1 is a cross-section view of a prior art wing and engine configuration.

The following detailed description of preferred embodiments refers to the accompanying drawings that illustrate specific embodiments of the invention. Other embodiments having different structures and operations do not depart from the scope of the present invention.

In the Figures herein, unique features receive unique reference numerals, while features that are the same in more than one drawing receive the same reference numerals throughout. The scope of the invention is not intended to be limited by materials, but may be carried out using any materials that allow the construction and operation of the present invention. Materials and dimensions depend on the particular application. The present invention may be used for any aircraft, whether private, commercial, or military, of any size.

Figure 2:
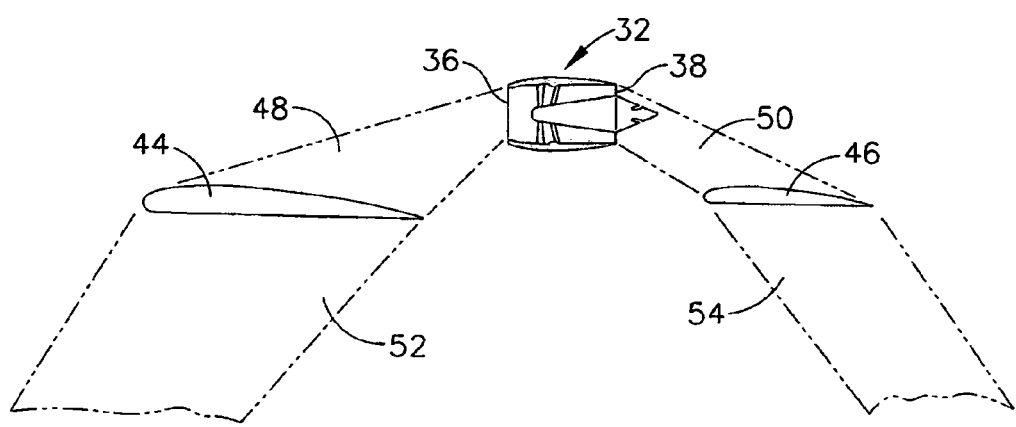
FIG. 2 is a cross-section view of another prior art wing and engine configuration.

Referring to the drawings, FIG. 1 shows a cross-section of a wing 30 and engine 32 showing a prior art configuration with the engine 32 mounted to the underside 34 of the wing 30. In addition to the unimpeded path of noise and heat, or infrared radiation, to the ground from both the intake 36 and exhaust 38 of the engine, sound and heat are directed 40 to the underside 34 of the wing 30 and are reflected 42 downward, increasing the noise and heat that are observed from the ground. FIG. 2 shows a prior art wing and engine 32 configuration where the engine 32 is mounted to the fuselage of the airplane higher than the wings 44, 46, which are fore and aft of the engine 32. Portions of the noise and heat 48, 50 emitted by the engine are blocked from the ground by the wings 44, 46. Shadow zones 52, 54 result from the wings 44, 46 blocking noise and heat, but the shadow zones 52, 54 provide relatively little impedance to noise and sound in that the wings 44, 46 do not extend below either the intake 36 or the exhaust 38 of the engine.

Figure 3:
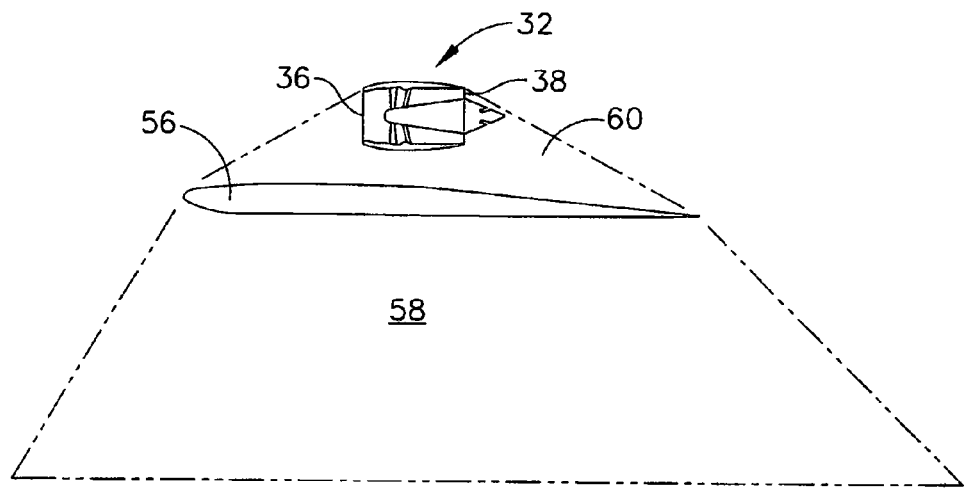
FIG. 3 is a cross-section view of a wing and engine configuration in accordance with an embodiment of the present invention.
Figure 4:
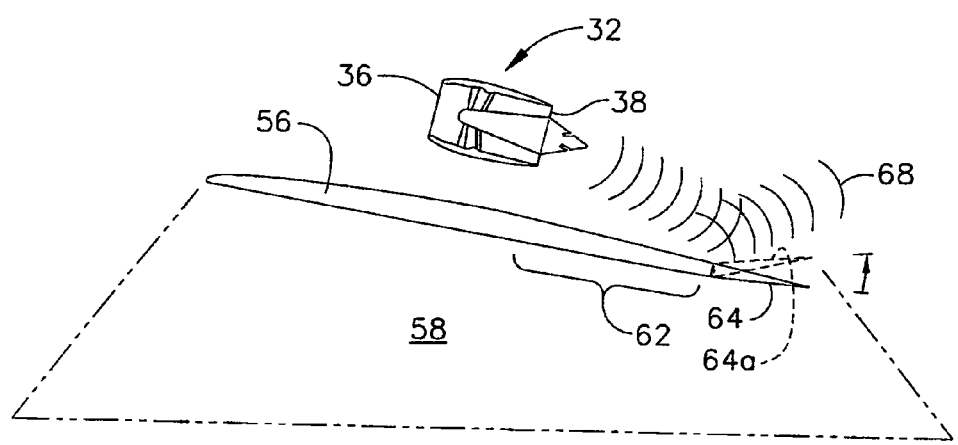
FIG. 4 is a cross-section view of a wing, aft deck, and engine configuration in accordance with an embodiment of the present invention.
Figure 5:
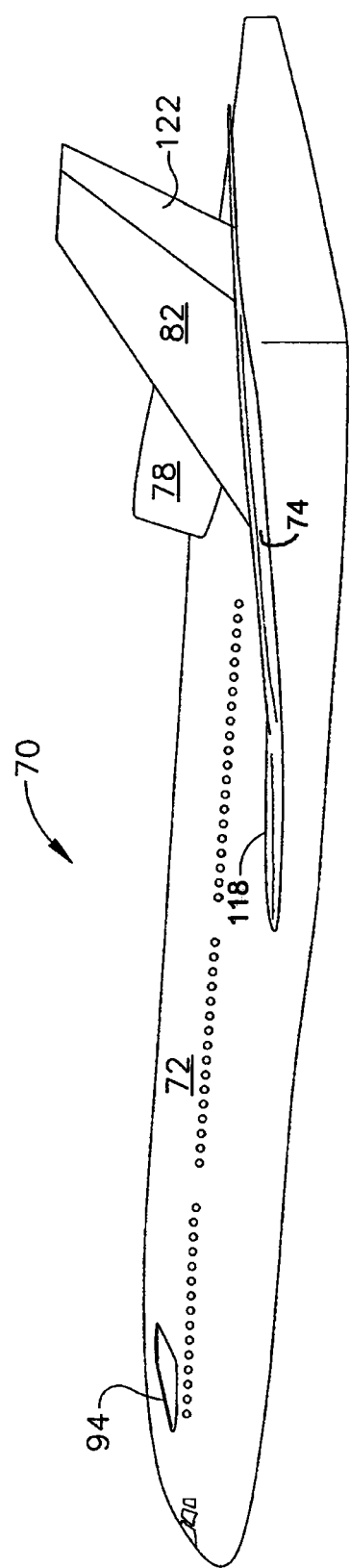
FIG. 5 is a side elevation view of an airplane in accordance with an embodiment of the present invention.

FIG. 3 shows an engine and wing configuration in accordance with the present invention, where the engine 32 is located above the wing 56. The wing 56 may extend fore and aft of the engine 32 to create a shadow zone 58 that is continuous, with rearward, underneath, and forward shielding of noise and heat 60 from the ground. FIG. 4 shows another configuration that may be part of the same aircraft as FIG. 3, where the wing 56 may extend to an aft deck 62. At the trailing end of the aft deck 62 there may be an upwardly rotatable pitch control surface 64. This pitch control surface 64 may be rotated to an upward position upwardly rotated pitch control surface 64a extends the shadow zone 58 and deflects noise and heat energy 68 upward when the wing 56 and aft deck 62 are at an upward angle as shown, as in takeoff and approach.

FIGS. 5-10 are views of an embodiment of an aircraft 70 in accordance with the present invention. The aircraft 70 may include a tubular fuselage 72, a pair of wings 74, 76 in a delta wing configuration, a pair of engines 78, 80, a pair of vertical stabilizers 82, 84, an aft deck 86, 88 on each side of the fuselage 72 with pitch control surfaces 90, 92, and a pair of canards 94, 96. The aircraft design shown in FIGS. 5-10 is for a subsonic aircraft, but many of same features apply to transonic and supersonic aircraft.

The tubular fuselage 72, shown as circular in cross-section, may be circular, elliptical, or other aerodynamic shape, and can be lengthened or shortened beyond a nominal length to optimize the payload-range capability for a family of derivative airplanes of the baseline vehicle. Sections may be area-ruled as needed. Area-ruling is a technique used to mitigate drag of transonic and supersonic designs, wherein the fuselage may be gradually narrowed at a central portion. The amount of narrowing required for wave drag reduction is proportional to the frontal area of contribution of the propulsion system. An elliptical cross-section may increase the width of the fuselage 72, allowing more seats in each row, and in turn permits more passengers to be accommodated than with a circular cross-section. Accordingly, an elliptical shape permits the same number of passengers as a circular cross-section within a shorter length of passenger compartment. This adds to available space for cargo at the rear of the aircraft 70 or provides for reduction of the length of the aircraft 70, and possibly eliminates the need to have passenger emergency egress on top of the delta wings 74, 76. An elliptical cross-section also allows main landing gear stowage without the need for heavy, drag inducing wing-to-body fairings.

The engines 78, 80 may be mounted above the delta wings 74, 76. In one embodiment, the engines 78, 80 may be mounted to the wings 74, 76 with vertical struts or pylons attached to structure other than the wing. Aerodynamic integration of engines wholly mounted over large surfaces, and in particular to wings, however, can be difficult due to the interaction of the flow with the upper wing surface, strut, and nacelle. Higher speeds exacerbate these effects. In the embodiment shown, the engines 78, 80 are mounted to the fuselage 72 with structural members 98, 100. The position of the engines 78, 80 above the wings 74, 76 and not connected to the wings 74, 76 allows air over the wings 74, 76 to pass freely without blocking airflow over the suction side of the wing. This may maximize lift production of the wings 74, 76 without undue interference from the engines 74, 76. A boundary layer, which is the flow adjacent to the wing surface that is less than 99% of the free stream flow, forms on top of the wing 74, 76, and the engine 78, 80 does not intersect this boundary layer.

There may be a "close-out" of the fuselage 72, being the part of the fuselage that is generally aft of the aft-pressure bulkhead, forward of the engines 78, 80 allowing supports 98, 100 for the fuselage-mounted engines 78, 80 to pass through the fuselage 72. A close-out is understood to occur at a point where the fuselage diameter or cross-sectional dimension begins to decrease progressively, and generally continuously, to a point of termination (e.g., the end of the tube). This may provide structural benefits such as may be realized from, for example, connecting the supports 98, 100 for the engines 74, 76 to each other or to other structural members within the fuselage 72. As an alternative, there may be only one engine, mounted on the top of the fuselage 72 and still longitudinally located such that the wings 74, 76 are outboard of the engine. Or, additional engines could be provided so that there is, for example, a pair of engines on each side of the fuselage 72.

Figure 6:
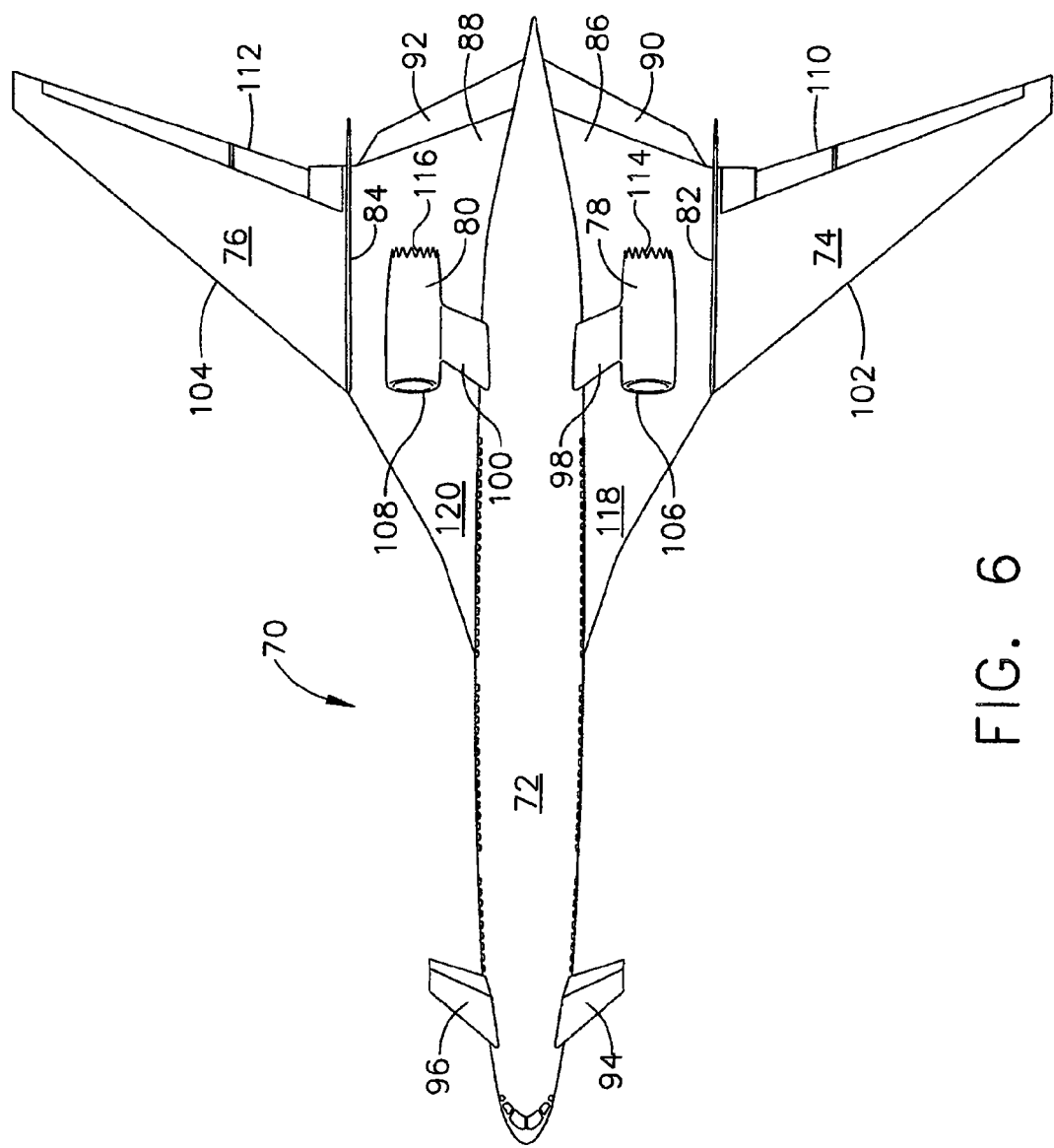
FIG. 6 is a top plan view of the airplane of FIG. 5.
Figure 7:
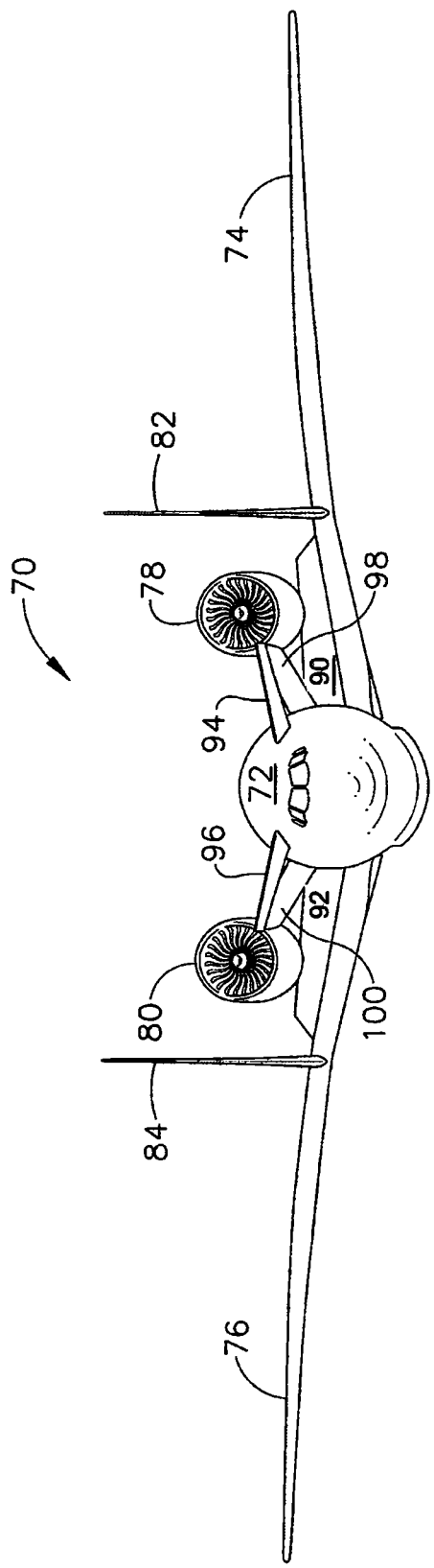
FIG. 7 is a front elevation view of the airplane of FIG. 5.
Figure 8:
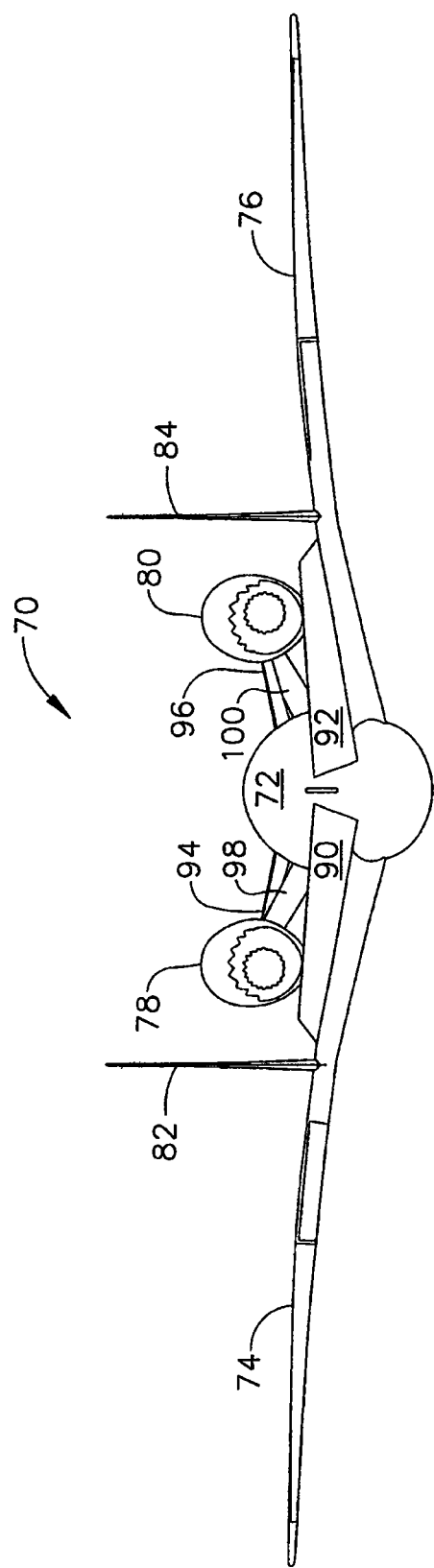
FIG. 8 is a rear elevation view of the airplane of FIG. 5.

The relative positions of the engines 78, 80 and wings 74, 76 may be selected to shield noise and heat from the ground to the degree possible while maintaining desired flight characteristics of the aircraft 70. As best shown in FIG. 6 the leading edge 102, 104 of the wing 74, 76 extends ahead of the intakes 106, 108 of the engine 78, 80 and the trailing edge 110, 112 of each wing 74, 76 extends past the engine exhausts 114, 116 to achieve the effect shown in FIG. 3. To accomplish this configuration, a delta wing design is desirable. A wing strake 118, 120 is provided at each leading edge 102, 104 of each wing 74, 76 near the fuselage 72, causing the wings 74, 76 to extend ahead of the engines' intakes 106, 108 for forward shielding. The wings 74, 76, fuselage 72, and strakes 118, 120 shield forward heat radiation from engine intake 106, 108 anti-icing systems.

Figure 9:
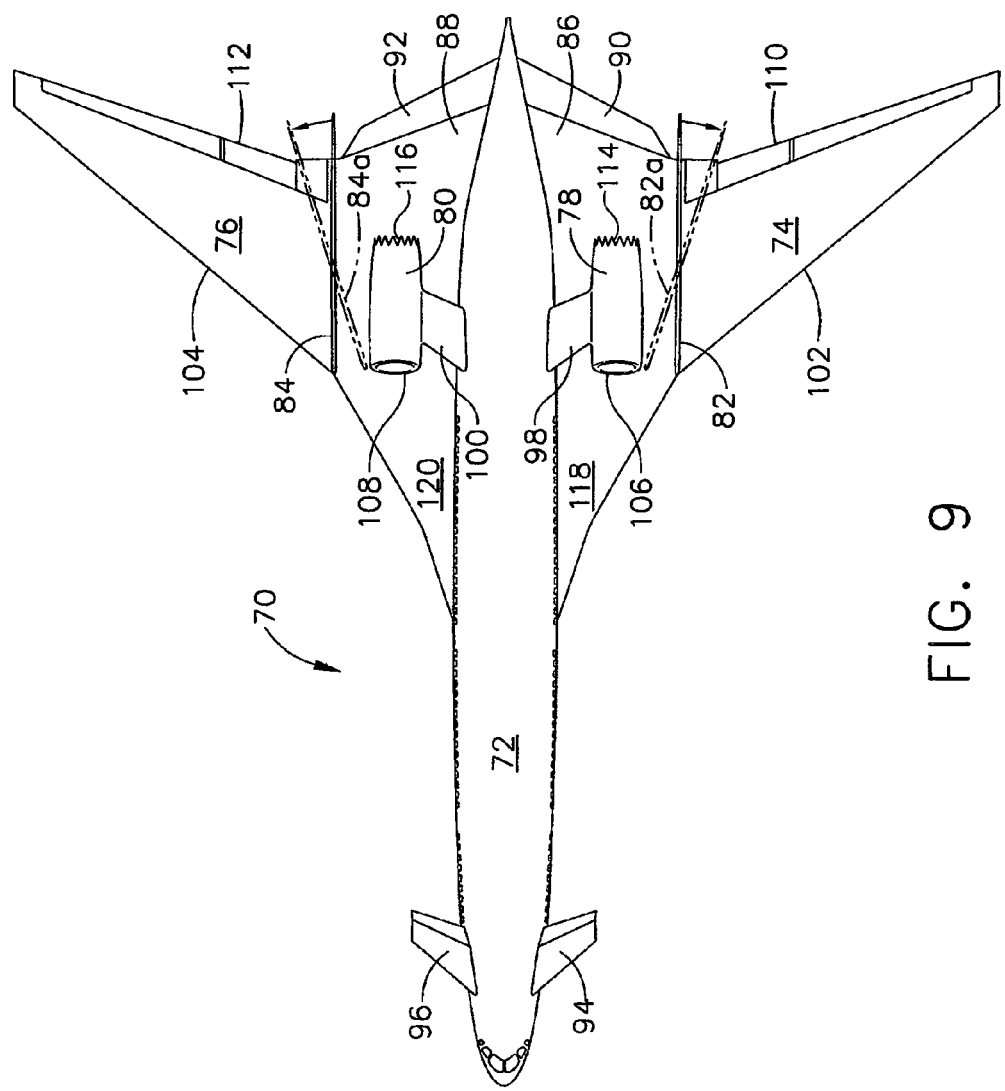
FIG. 9 is a top plan view of an alternative configuration of the airplane of FIG. 5.
Figure 10:
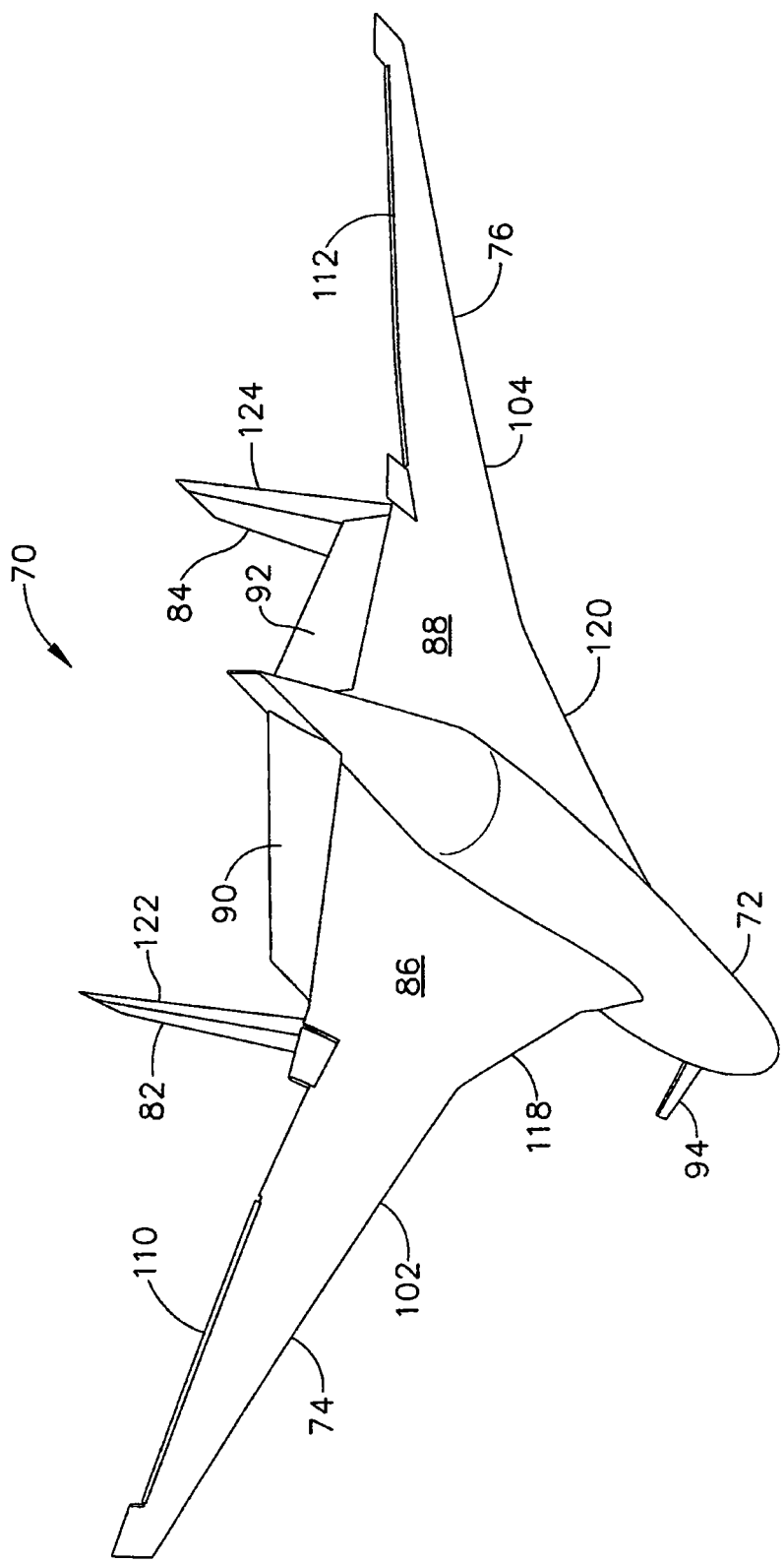
FIG. 10 is an upward perspective view of the airplane of FIG. 8.

Outboard of each outermost engine is a vertical stabilizer 82, 84. The vertical stabilizers 82, 84 shield lateral travel of noise and heat, and may include rudders 122, 124 for directional control. As shown, the vertical stabilizers 82, 84 are taller than the uppermost point of the nacelles of the engines 78, 80, but the height may be as selected by one of ordinary skill in the art. One criterion may be for the vertical stabilizer 82, 84 to extend at least as high as the longitudinal axis of the highest engine, as measured at that engine's lowest point. In the embodiment shown, the vertical stabilizers 82, 84 are located at the intersection of the wing strake 118, 120 and the remainder of the wing 74, 76, and extend from the leading edge 102, 104 of each wing 74, 76 to the trailing edge 110, 112. The vertical stabilizers can be fixed with movable yaw-control surfaces or can be wholly rotating, in which case they can also be rotated 82a, 84a in a partial (or completely perpendicular) attitude with the freestream, as shown in FIG. 9, to provide additional drag and braking during runway deceleration after touch-down.

The aft deck, in two portions 86, 88 is an extension of the central rear portion of the wings 74, 76, and is a multi-purpose structural and aerodynamic element that provides structural support for the wings, stabilizers, and landing gear, provides housing for systems, and positively contributes to airplane lift to drag ratio. The pitch control surface 90, 92 includes an elevator on each portion 86, 88 of the aft deck. The elevators 86, 88 may be non-structural devices. Rotating the pitch control surface 90, 92 upward, as may best be seen in FIG. 10, blocks line of sight to the engines and provides the effect of blocking and reflecting noise and heat as shown in FIG. 4. The pitch control surface 90, 92 may extend approximately the entire distance between the fuselage and each vertical stabilizer 82, 84.

Figure 11:
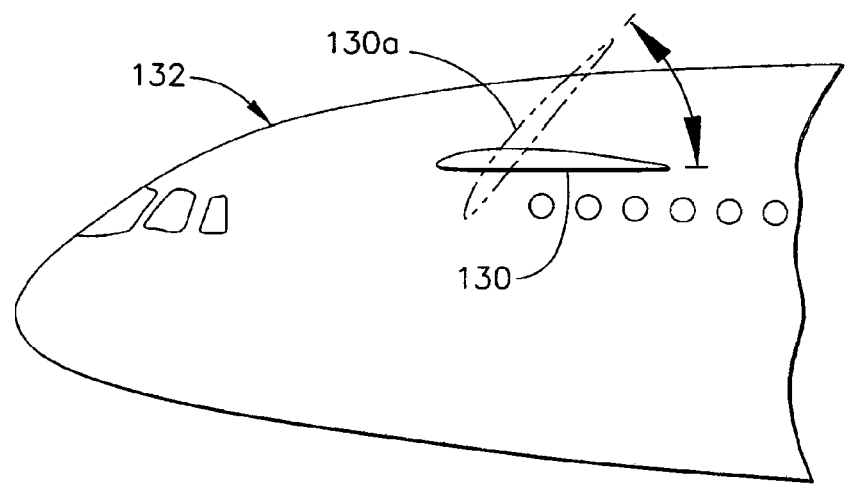
FIG. 11 is a side elevation view of a portion of an airplane and a canard in accordance with an embodiment of the present invention.
Figure 12:
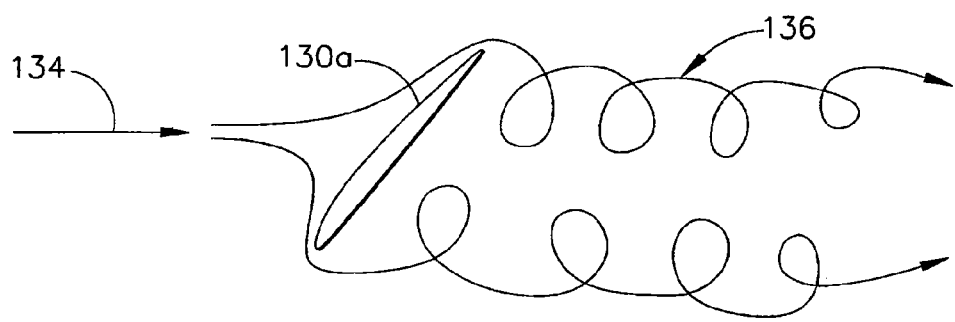
FIG. 12 is a side elevation view of the canard of FIG. 11, showing operational characteristics.

Canards 94, 96 provide vertical lift at the front of the aircraft 70. The canards may be mounted higher than the longitudinal axis of the aircraft 70, as shown, or lower than the axis. The canards may be, for example, straight, forward or rearward swept, dihedral, span or tip treated, fixed with hinged control surface, or fully rotatable, all flying. A fixed canard with a hinged control surface is analogous to a typical fixed wing with movable leading or trailing edges. A fully rotatable, all flying canard is a design whereby the entire canard rotates about a central axis that is horizontal or nearly horizontal and extends laterally from the fuselage, providing significant control authority. FIGS. 11 and 12 show a fully rotatable, all flying canard 130 mounted to an aircraft 132, rotated to be at an angle to the freestream 134 at an orientation 130a. Such a canard could potentially be used as a braking device during runway deceleration. The span and design of the canard tip may be chosen specifically so that tip vortices are either greatly mitigated or managed such that there is minimal risk of vortex ingestion into the engines. A high mount canard may feature an articulated design that folds out of the way of the passenger boarding bridge, and a low-mount canard design may be tailored (for example, with a slight anhedral degree) so that it slips in under the passenger boarding bridge.

Figure 13:
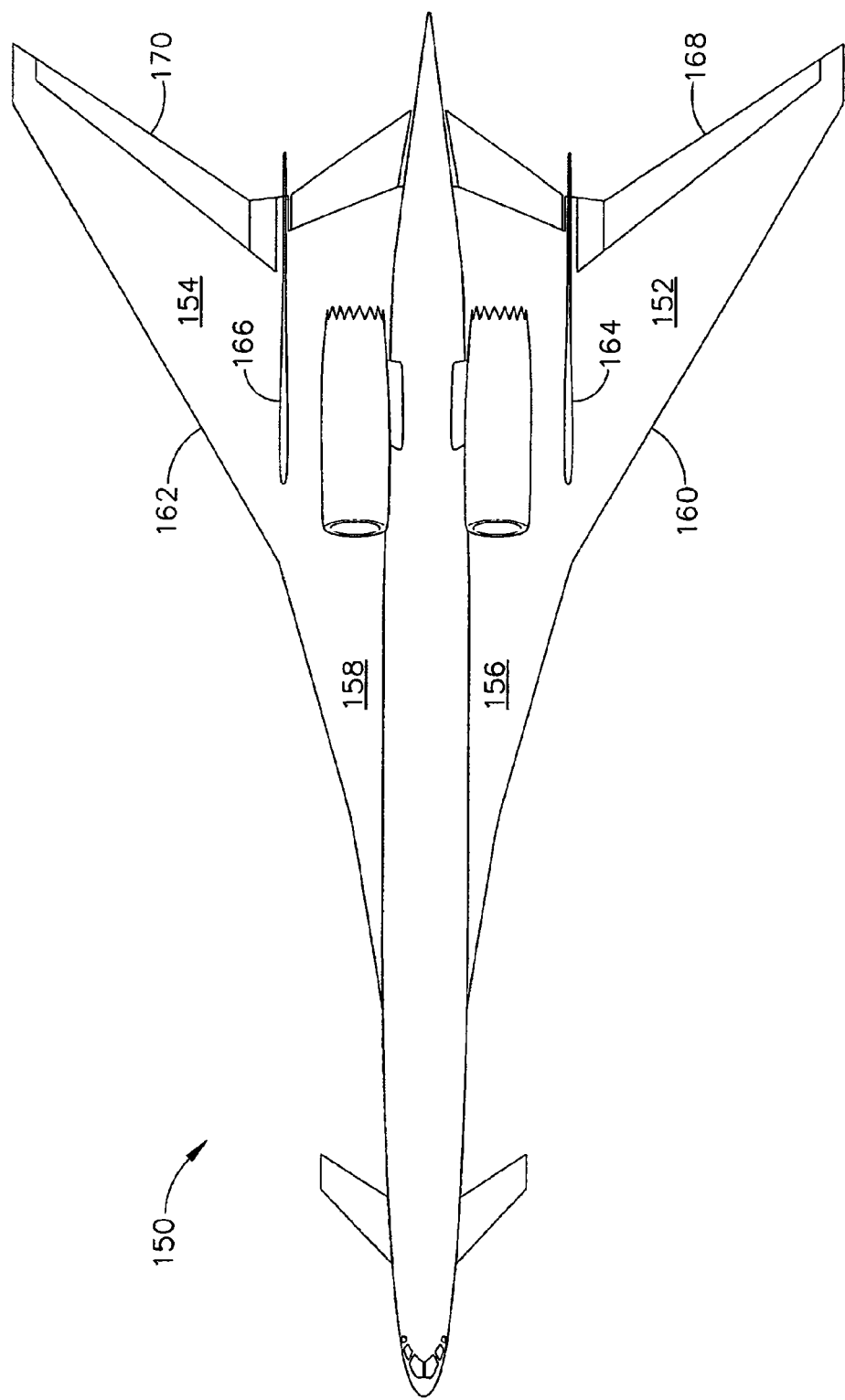
FIG. 13 is a top plan view of an airplane in accordance with another embodiment of the present invention.

FIG. 13 shows an embodiment of a supersonic aircraft 150 according to the present invention. These features may also be applied to subsonic aircraft. The supersonic design may present a configuration that can simultaneously reduce community noise, infra-red radiation, and sonic boom experienced by the ground. The reduction of shock wave propagation from the propulsion system is largely a benefit during high-speed climb and cruise. The wings 152, 154 may have increased sweep and larger strakes 156, 158 as compared to a subsonic design 118, 120. The leading edges 160, 162 of the wings 152, 154 may extend fore of the vertical stabilizers 164, 166, and the trailing edges 168, 170 of the wings 152, 154 may extend aft of the vertical stabilizers.

Effective and efficient jet noise control described herein stems from factors that may include, but not be limited to: (1) the accumulation of advanced understanding of noise frequency dependence of noise shielding surfaces which may serve to obscure and/or reflect noise generating sources; (2) the understanding of inherent frequency dependence of jet noise sources combined with specific know how to modify such to advantage; (3) the avoidance of adding unnecessary parasitic weight, cost, or efficiency burden to accomplishing effective shielding (by employing only those arrangements of required aerodynamic and control surfaces for efficient flight in the secondary purpose of shielding or blocking noise; and finally (4) the understanding of how operational spatial arrangements (critical angles and ranges) specifically affect the noise that has to be shielded to ensure future global noise regulatory certification compliance, as well as the compliance with local operational noise monitoring standards. Embodiments described herein combine modification of primary jet noise sources through insertion of engine exhaust design features to purposely affect jet noise frequency redistribution, with an aircraft design that provides for lower hemispherical and other directional shielding of noise by means of an arrangement of aerodynamically useful surfaces acting as noise shields and positions of the noise sources. Together these may accomplish a further improved noise shielding capability to address a variety of regulatory stringencies and arrangements of airport and community noise monitoring and compliance standards.

Aircraft that typically employ separated flow engines may be modified, as shown in several embodiments herein, with types of engine exhaust blending/mixing devices that are designed to explicitly shift jet exhaust noise emission frequencies and source locations within exhaust flow field boundaries behind the engines. Such a shift in noise frequency and source location, or a "noise shift effect," with such noise shifting apparatus can have a substantial combined benefit in reducing takeoff and sideline noise. There may be, for example, a low frequency noise reduction and a concurrent increase in high frequency noise, or "high frequency lift." Shielding efficiency for a set of aircraft flight and control surfaces may be enhanced when coupled with the shift in noise sources to higher frequencies and to within closer locations behind the engine exit.

The degree of noise shift effect that has been observed in modern acoustic imagery from state of the art microphone arrays is strongly correlated with the specific technologies invoking the effect. The range of experience is from lesser shift effects found in the attachment of serrated chevrons for post exit flow blending all the way to the greatest effect obtained by employing forced blending or mixing of the jet exhaust flows entirely within the interior of the engine exhaust cavity. Aside from just chevrons or full mixers, intermediate solutions are also of value, wherein combinations of chevrons and partial flow mixing may create new opportunities that allow shedding of many of the burdens of trying to maintain aircraft thrust performance while simultaneously aggressively reducing noise. The preservation of engine thrust is a key condition to the utility of the apparatus responsible for the noise shift.

Forced mixers create the greatest magnitude of noise shift effect, as they reduce much of the originating source production mechanism by release of unsteady turbulent shear energy in boundaries between different velocity flows, with much of the mixing accomplished before the exhaust even exits the engine cavity. Regarding mixers there may be two types of cool reservoir air induction into the mixing chamber depending on flight speed regime: (1) bypass induction for traditional subsonic engine forced mixers, and (2) ejected induction forced mixers, perhaps appropriate for supersonic capable engines. As eluded to above, the aggressiveness of the noise shifting devices also plays an essential role in thrust losses experienced in blending the exhaust flows, so it is intended that the combination of exhaust blending modifications with arranged aircraft shielding results in thrust losses being limited only to times of flight when the jet noise production has impact to communities (takeoff and climb-out), or that the overall thrust losses be confined to a minimum level that is acceptable to achieve a reasonably effective broadband jet noise reduction.

Figure 14:
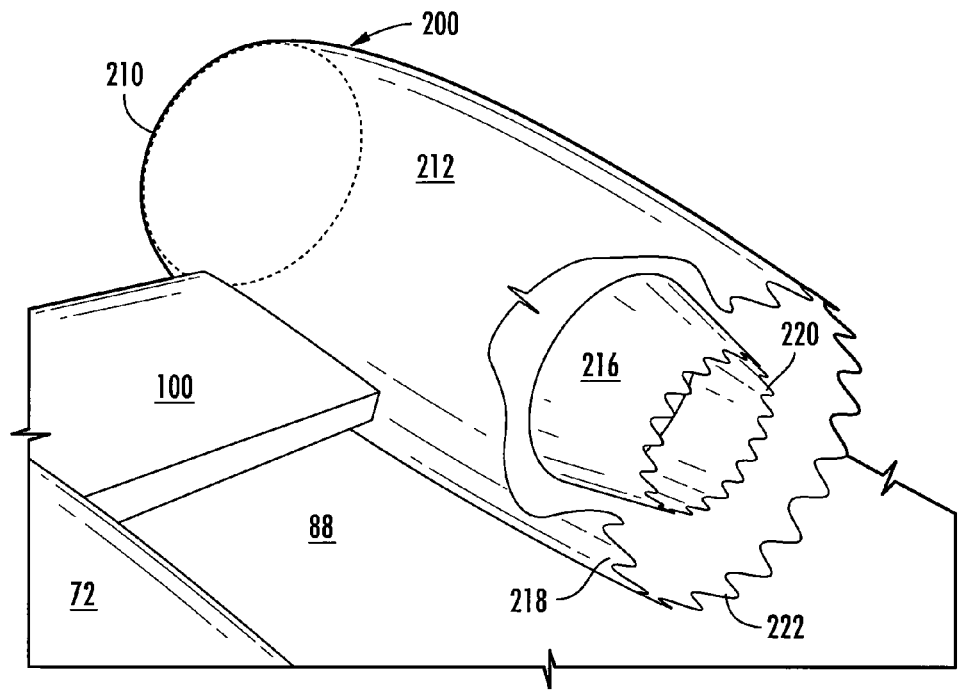
FIG. 14 is a cut-away simplified perspective view of an embodiment of a nacelle with primary and secondary chevrons, mounted to the airplane shown in FIG. 5.
Figure 15:
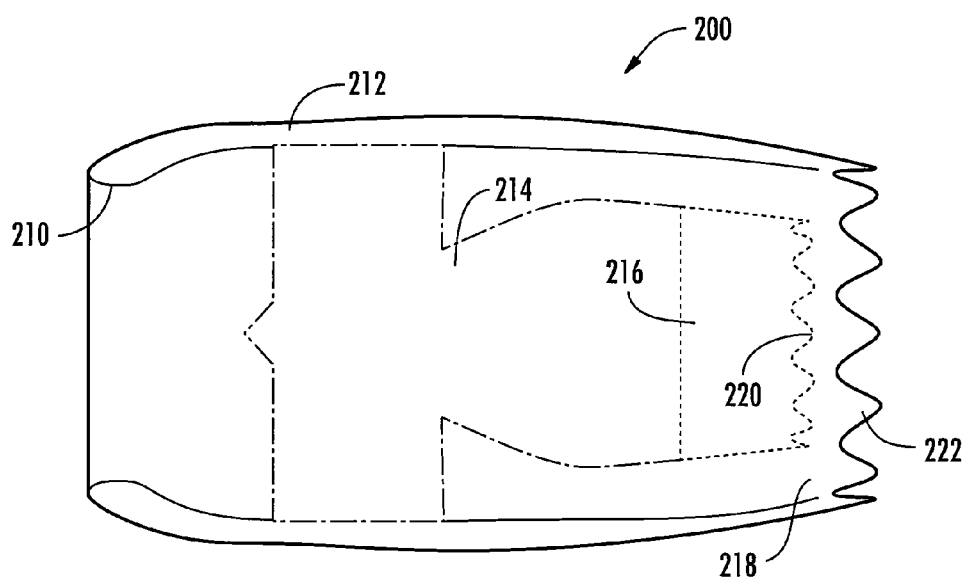
FIG. 15 is a simplified schematic section view of the nacelle shown in FIG. 14.
Figure 18:
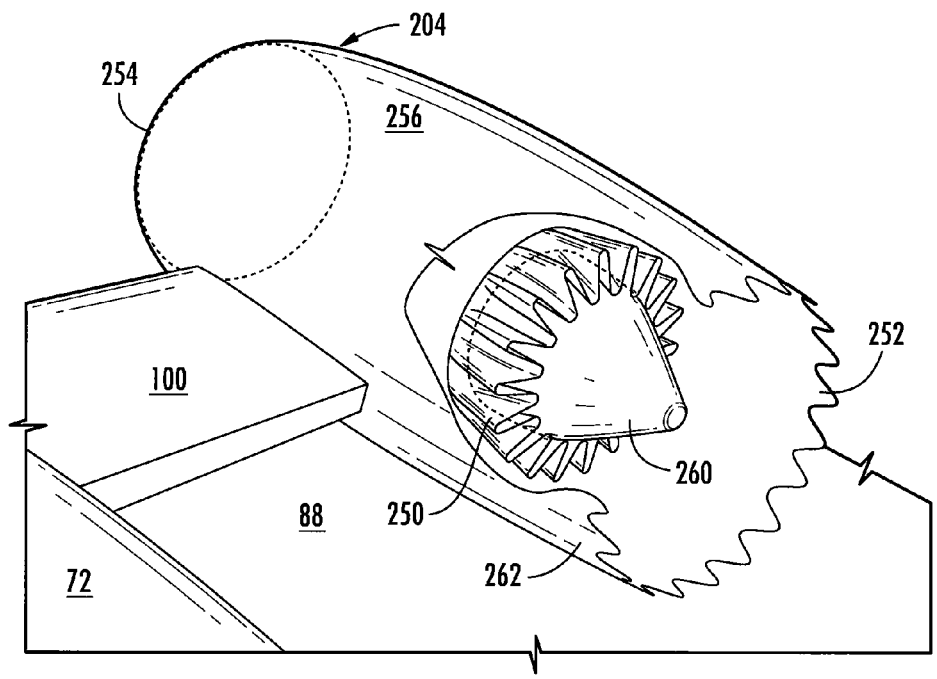
FIG. 18 is a cut-away simplified perspective view of an embodiment of a nacelle with a long duct full flow mixer and secondary chevrons, mounted to the airplane shown in FIG. 5.
Figure 19:
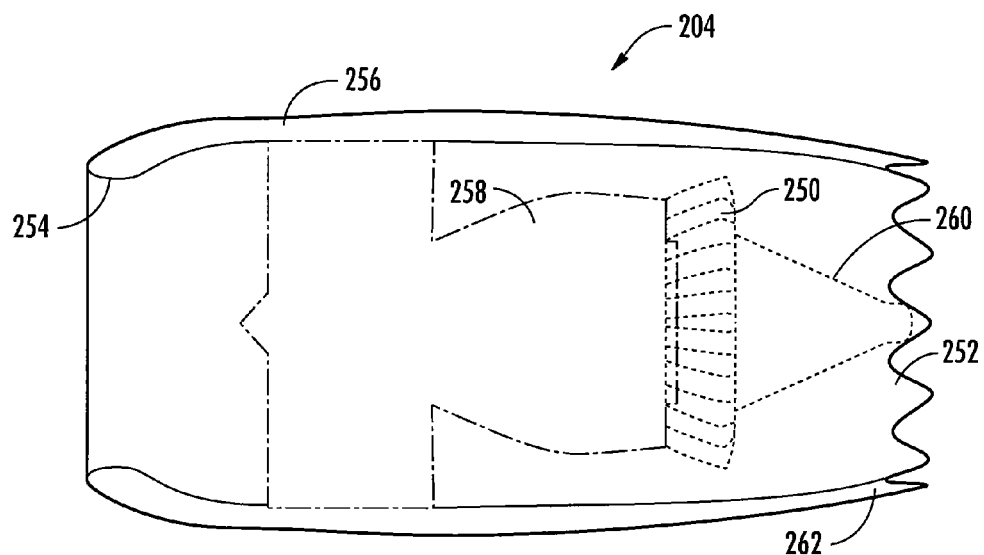
FIG. 19 is a simplified schematic section view of the nacelle shown in FIG. 18.

Nonlimiting embodiments of the following three types of noise shifting modification apparatus, as described further below, are relevant to minimizing burdens on engine thrust performance: (1) chevron devices, both fixed and variable geometry chevrons (those chevrons that can be actuated just at the right time for greater insertion into the exit flow by either electrical, mechanical, or pneumatic means, or by employment of thermal memory materials) (FIGS. 14 and 15); (2) a partial bypass mixer in combination with low penetration, un-actuated (fixed) chevrons, where the partial mixer may use, for example, a flow splitter near the end of the fan duct to separate approximately 50-60% of the fan bypass for exhaust by normal means and to channel approximately 40-50% of the fan bypass under fan pressure into a forced mixing (lobe type mixer) exhaust chamber to mix fully with the pressurized core jet exhaust and with the mixed gases exiting through a combined nozzle (FIGS. 16 and 17); and (3) a long duct full-flow mixer in combination with low penetration, un-actuated chevrons to duct the entire fan bypass flow under pressure into a forced lobe type mixer to fully mix and axially blend with the pressurized core jet exhaust, the entire mixture exiting out one large exit (FIGS. 18-19). In addition to noise frequency redistribution mentioned above, use of internal mixing devices, in particular lobed mixers, reduces the peak jet velocity which typically is located on the engine axis. By reducing the peak velocity, the momentum and magnitude of large scale vortices convected far aft of the engine is reduced thereby moving the jet noise source closer to the engine, thereby concentrating more of the sound energy over the shielding barrier to be shielded.

FIGS. 14-19 show simplified views of turbofan engine nacelles designated as 200 (FIGS. 14 and 15), 202 (FIGS. 16 and 17), and 204 (FIGS. 18 and 19). The vertical stabilizer 84, wing 76, strake 120, and part of the aft deck 88 are not shown. Each of these turbofan nacelles 200, 202, 204 may be substituted for the parts designated as engines 78, 80 in FIGS. 5-9. The turbofan engine nacelle 200 of FIGS. 14 and 15 is a long duct nacelle and includes a fan inlet 210, fan cowl 212, engine 214 (not shown in FIG. 14), thrust reverser (not shown), core nozzle 216, and a fan nozzle 218. The core nozzle 216 may include primary chevrons 220 that extend at the trailing end of the core nozzle 216, and the fan nozzle 218 may include secondary chevrons 222 that extend at the trailing end of the fan nozzle 218. The term "chevrons" traditionally implies triangular, tab-like elements located on a trailing edge of the fan or core nozzles of turbofan jet engines used to suppress noise generated by the engines, but may also vary in shape. In the embodiments shown herein, the serrated edges on the trailing ends of the fan nozzles are chevrons, which may be deformable, as described further with respect to FIG. 29 below. If the chevrons are deformable, a control unit may be provided to actuate the chevrons if actuation is not provided based on material characteristics alone.

Figure 16:
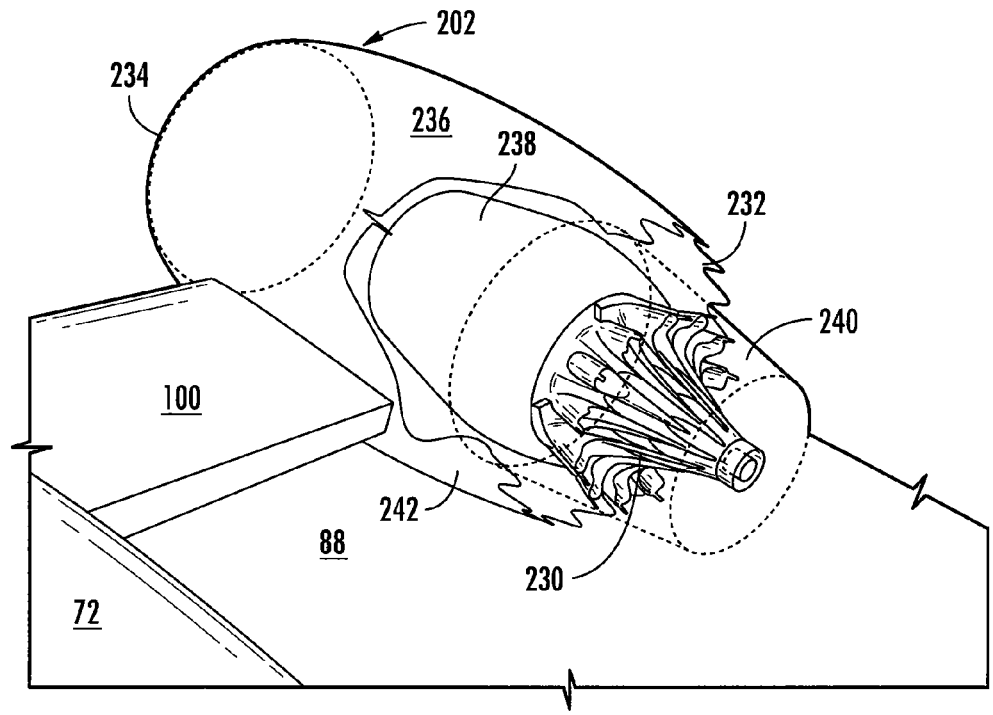
FIG. 16 is a cut-away simplified perspective view of an embodiment of a nacelle with a partial bypass mixer and secondary chevrons, mounted to the airplane shown in FIG. 5.
Figure 17:
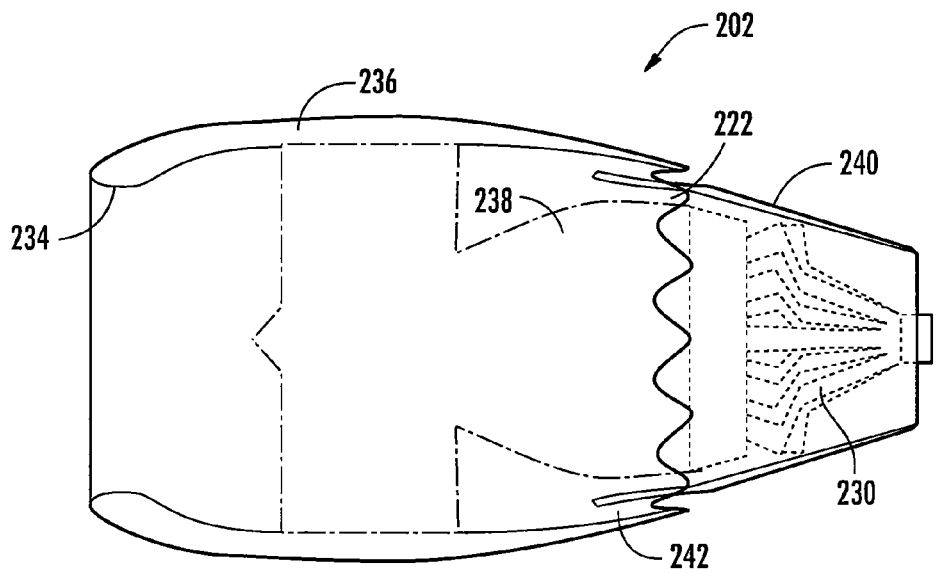
FIG. 17 is a simplified schematic section view of the nacelle shown in FIG. 16.

The turbofan engine nacelle 202 embodiment of FIGS. 16 and 17 is partial bypass mixer 230 (lobe type) for forced mixing in combination with low penetration, un-actuated (fixed) secondary chevrons 232. The nacelle 202 is short duct and also includes a fan inlet 234, fan cowl 236, engine 238, thrust reverser (not shown), core nozzle 240, and a fan nozzle 242. The fan inlet 234 and fan nozzle 242 may be referred to as "ducts". The propulsive machine that creates thrust is one or more of a gas generator, turbofan 238 (in this case), or engine, which include a core nozzle 240. The propulsion system is attached to the engine 238 by a pylon that connects the gas generator/engine to the airplane, which is contoured and/or blended into the nacelle 202.

The fan nozzle 242 may include the secondary chevrons 232 that extend at the trailing end of the fan nozzle 242. Partial bypass mixers are described in detail in U.S. Pat. No. 7,762,057, issued Jul. 27, 2010 and entitled "Internal Mixing of a Portion of Fan Exhaust Flow and Full Core Exhaust Flow in Aircraft Turbofan Engines," the contents of which are incorporated herein by reference in their entirety.

The turbofan engine nacelle 204 embodiment of FIGS. 18 and 19 is a long duct full-flow mixer, including a forced lobe type mixer 250, in combination with low penetration, un-actuated chevrons 252. The nacelle 204 is long duct and also includes a fan inlet 254, fan cowl 256, engine 258 (not shown in FIG. 18), thrust reverser (not shown), core nozzle 260, and a fan nozzle 262. The fan nozzle 262 may include the secondary chevrons 252 that extend at the trailing end of the fan nozzle 262.

Figure 20:
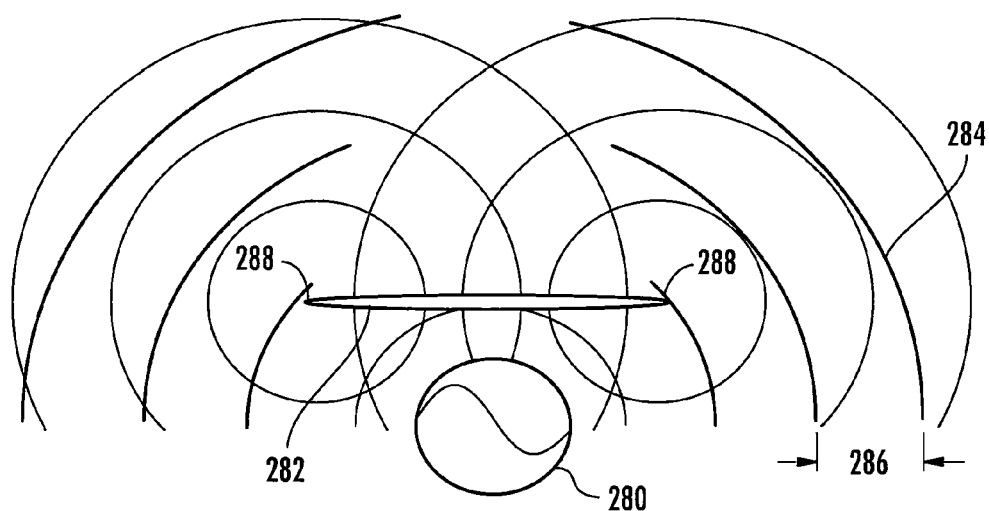
FIGS. 20 and 21 are diagrams of noise sources and shielding barriers.
Figure 21:
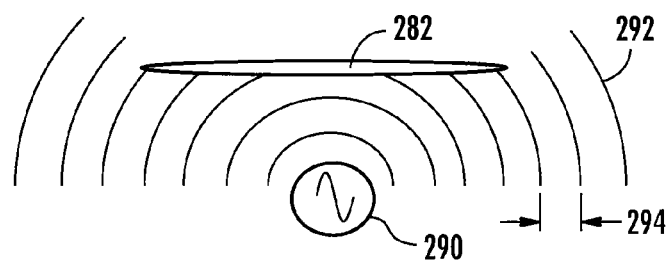

FIGS. 20 and 21 show the effect of a noise shift. In FIG. 20, an un-altered noise source 280 is shown proximate to a shielding barrier 282. In this example, the barrier size may be less than two wavelengths, or the noise frequency is relatively low. The wavelength of noise 284, schematically designated at 286, is relatively long, and it may be seen that while there is some shielding, much of the sound passes around the barrier 282. The barrier 282 is an ineffective shield, and the barrier tends to couple as dipoles for additional sources of noise 288. In FIG. 21, the noise source 290 may have been altered to result in a noise shift of the noise 292. The size of the barrier 282 is multiple wavelengths, with a wavelength being designated as 294, or the noise frequency is relatively high, and the barrier 282 can act as an effective shield.

Figure 22:
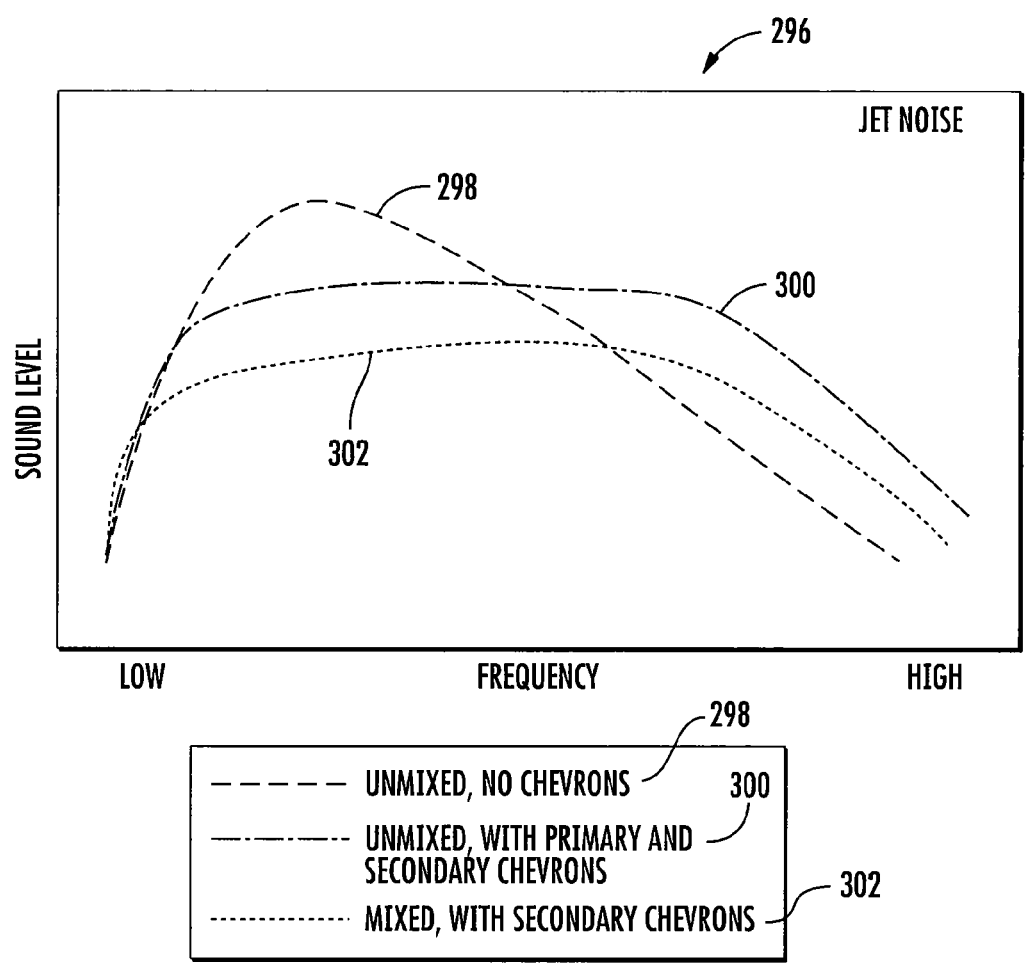
FIG. 22 is a graph of jet noise, plotting sound level versus frequency.

The principle of a noise shift is shown in the graph of FIG. 22, which is an example plot 296 of sound level versus frequency for jet noise. Towards the left end of the graph 296, the unmixed flow with primary and secondary chevrons noise 298 is depressed below the unmixed flow without chevrons noise 300, and the mixed flow with secondary chevrons noise 302 is depressed yet further. This may be referred to as a low frequency noise reduction. Towards the right end of the graph 296, the mixed flow with secondary chevrons noise 302 has elevated above the unmixed flow without chevrons noise 300, and the unmixed flow with primary and secondary chevrons noise 298 has increased even more. This may be referred to as high frequency lift, which tends to radiate in a substantially lateral direction.

Figure 23:
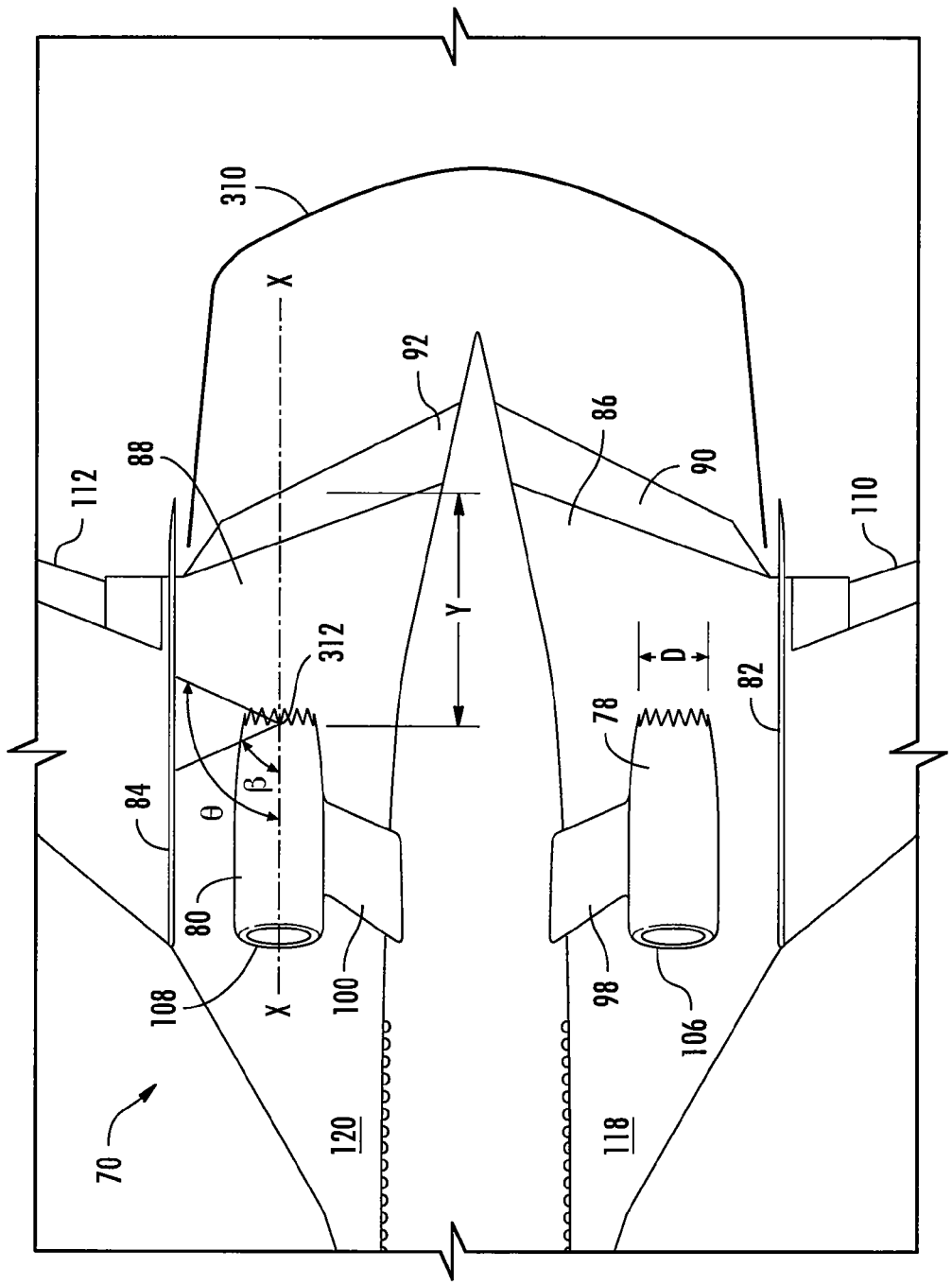
FIG. 23 is a detailed top plan view of a portion of the airplane shown in FIG. 5.

The implication of a noise shift may be seen in FIG. 23. The aircraft 70 that is shown (which could instead be aircraft 150), with longitudinal axis X-X of the engine 80 (for which nacelles 200, 202, 204 in FIGS. 14-19 may be substituted), includes apparatus, such as chevrons, a mixer, or combinations thereof that result in a noise shift. Line 310 designates an exemplary additional length of shielding, in this case an extension of the aft deck 88, which would need to be provided for equivalent shielding for nacelle 200 were there not a noise shift that increased the frequency of the noise from the theoretical noise source point 310. The theoretical noise source point 312 is located in this case from a point on the longitudinal axis X-X of the engine 80 and in a plane perpendicular to the longitudinal axis X-X of the engine 80 that passes through the root of the chevrons. This additional length of shielding to line 310 will vary depending on the aircraft, nacelle, and geometry and configuration thereof, but may reflect undesirable parasitic weight, cost, or efficiency burden to accomplishing effective shielding.

FIG. 23 further shows that angles of particular concern for high frequency lift are shielded. Taken from the theoretical source point 312 of noise and measured clockwise from the longitudinal axis X-X of the engine 80, there may be a range of angles where high frequency lift is greatest. In this case, drawn in a lateral plane this is between β angle of approximately 60 degrees and a θ angle of approximately 115 degrees, and it may be seen that noise between these angles is shielded by the vertical stabilizer 84; it is also shielded in a vertical plane downward as well. High frequency lift is not limited to being between these angles, but in some cases this range is where the high frequency lift is greatest and shielding preferably should be assured.

The inside diameter D of each fan nozzle is at the trailing end of the fan nozzle (FIG. 15, fan nozzle 218; FIG. 17, fan nozzle 242; FIG. 19, fan nozzle 262). With respect to the aircraft 70 shown, the distance Y from the trailing end of the upwardly rotatable pitch control surface 92 along the longitudinal axis X-X of the engine 80 is approximately three fan nozzle diameters.

Figure 24:
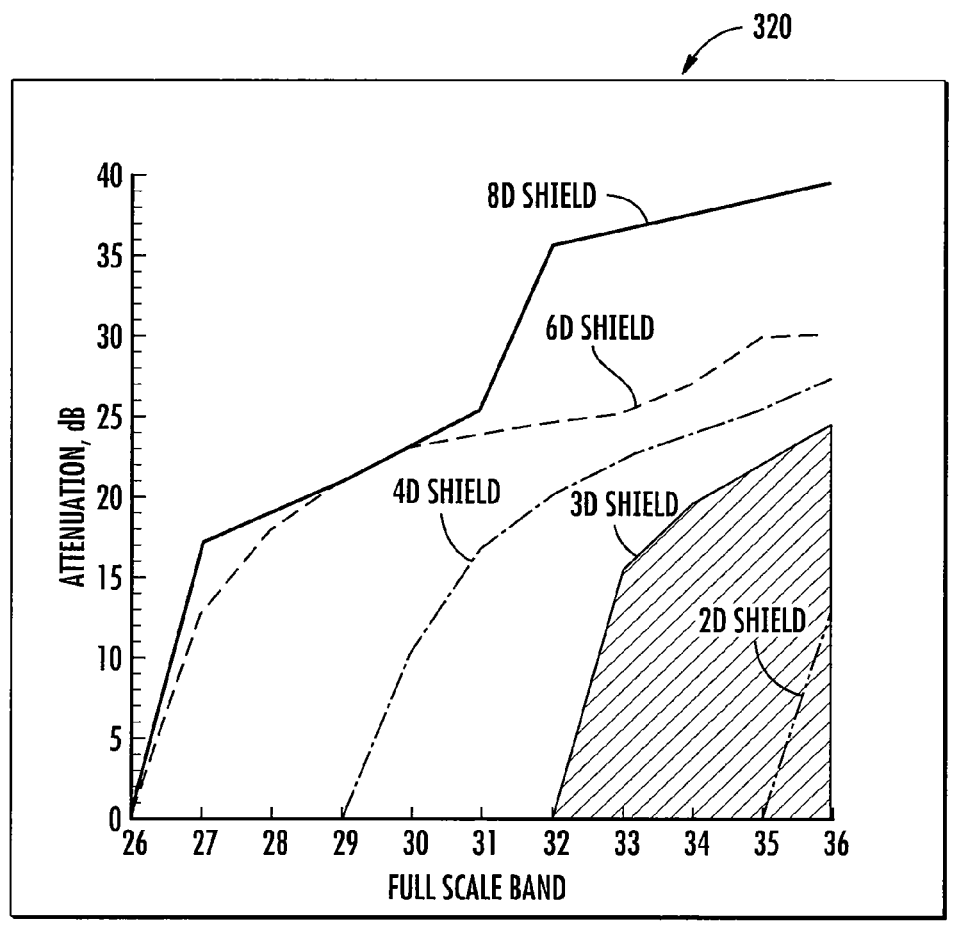
FIG. 24 is a parametric barrier length analysis versus frequency band plot showing attenuation of noise.

FIG. 24 shows a parametric barrier length analysis versus frequency band plot 320 using a validated industry standard noise barrier analysis code. In this figure, the barrier length is described as a multiple of nozzle diameters to the trailing end of the aft deck (2D, 3D, 4D, 6D, and 8D Shield distances). The shielding performance of the embodiment of the aircraft 70 described herein for typical high frequency lift frequencies is shown with the 3D Shield curve, and the attenuation for this shield is shaded. For this analysis, the fan nozzle is based on being located one fan nozzle diameter above the horizontal shielding surface, given that closer spacing can produce adverse aeroheating plus fluid interaction effects, including the coanda effect and jet-flap interaction.

As shown and for the aircraft 70 described herein, noise reduction from shielding including a barrier length of approximately 3D for bands 33 and higher is better than 10 dB, which for purposes of the noise certification metric (Effective Perceived Noise Level, or EPNL), sound in these frequencies would not result in an EPNL penalty. Other noise metrics which penalize high frequency noise are positively affected as well, including dBA and Sound Exposure Level (SEL). FIG. 24 shows attenuation performance of high frequency lift bands for longer barriers as well, should a compelling reason outside of typical design practice exist such as a fallout of airplane integration, vertical tail sizing, or infrared barrier shielding requirements.

Figure 26:
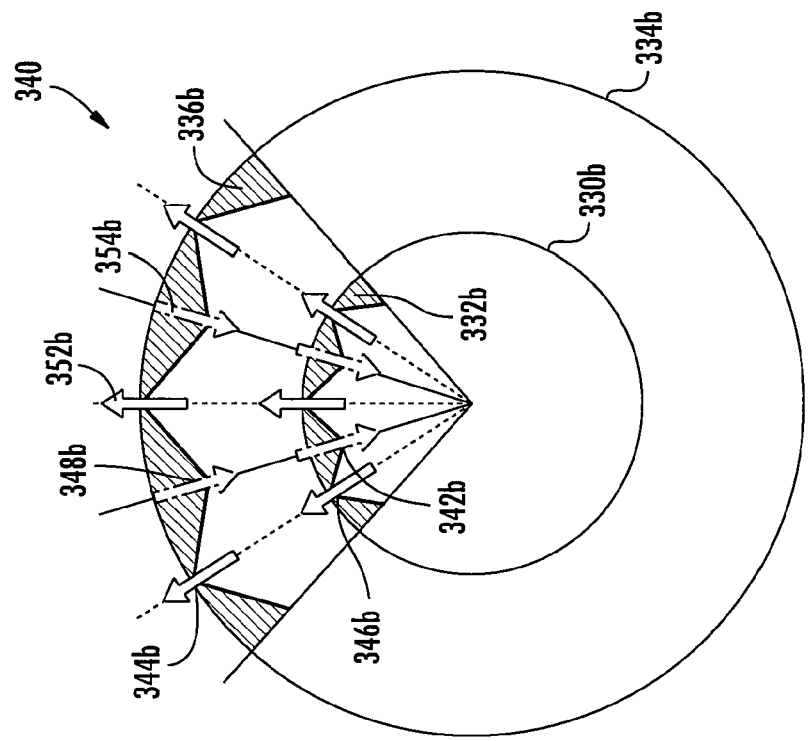
FIGS. 25 and 26 are simplified schematic cross-section views of a nacelle with different relative angular orientations of primary and secondary chevrons, and their noise performance.
Figure 25:
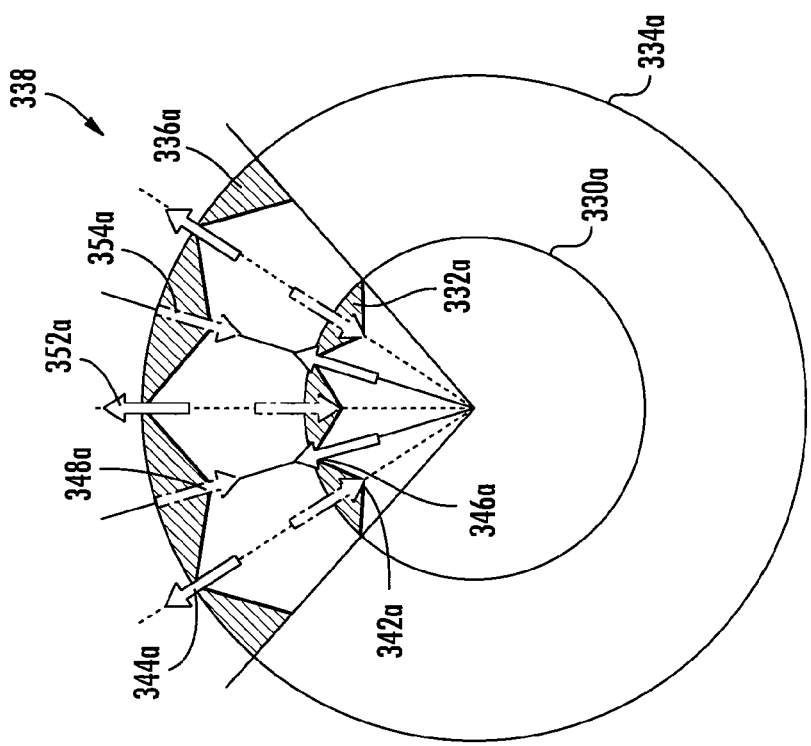

FIGS. 25 and 26 schematically show a core nozzle 330a, 330b with primary chevrons 332a, 332b and a fan nozzle 334a, 334b with secondary chevrons 336a, 336b, in two configurations 338, 340. Only a portion of the chevrons 332a, 332b, 336a, 336b are shown, but it should be understood that the chevrons 332a, 332b, 336a, 336b extend fully around the nozzles 330a, 330b, 334a, 334b. The first configuration 338, in FIG. 25, with respect to the angular positions of the primary and secondary chevrons 332a, 336a, is such that the tips 342a of the primary chevrons 332a are aligned with valleys 344a of the secondary chevrons 336a (tip-to-valley). Further, the valleys 346a of the primary chevrons 332a are aligned with the tips 348a of the secondary chevrons 336a (valley-to-tip). Solid arrows 352a, pointing outward from the center, also indicate the locations of valleys, while dashed arrows 354a, pointing inward toward the center, indicate the locations of tips.

The second configuration 340, in FIG. 26, is a configuration of the angular positions of the primary and secondary chevrons 332b, 336b with the valleys 346b of the primary chevrons 332b aligned with valleys 344b of the secondary chevrons 336b (valley-to-valley). Further, the tips 342b of the primary chevrons 332b are aligned with tips 348b of the secondary chevrons 336b (tip-to-tip). Solid arrows 352b, pointing outward from the center, also indicate the locations of valleys, while dashed arrows 354b, pointing inward toward the center, indicate the locations of tips. This results in high frequency noise emitted from the secondary chevrons 336b and the primary chevrons 332b being in an additive relationship, and low frequency noise emitted from the secondary chevrons 336b and the primary chevrons 332b being in an additive relationship also being in an additive relationship. Because of the cumulative effect of the aligned valleys 344b, 346b and aligned tips 342b, 348b, the low frequency noise reduction increases (generally beneficial) and the high frequency lift increases (beneficial when shielding is provided, as in, but not limited to, aircraft 70 and aircraft 150 described herein). The configurations 338, 340 of FIGS. 25 and 26 are applicable to when there is a one-to-one ratio of primary and secondary chevrons as shown, but may also be applicable when the primary chevron count divides evenly into the secondary chevron count, or when the secondary chevron count divides evenly into the primary chevron count.

A combination of chevrons and a lobed mixer also affects noise. Use of chevrons with lobed mixers may be advantageous for noise generally because each lobe of a mixer produces a lobe of partially mixed flow at the nozzle exit, which is the station at the end of the nozzle, that the chevron can work to further mix. Lobed mixers without scallops or cutback produce high frequency lift like chevrons.

FIGS. 27 and 28 schematically show a core nozzle 360a, 360b with a lobed mixer 362a, 362b and a fan nozzle 364a, 364b with secondary chevrons 366a, 366b, in two configurations 368, 370. Only a portion of the lobed mixers 362a, 362b and chevrons 366a, 366b and lobes 372a, 372b are shown, but it should be understood that the chevrons 366a, 366b and lobes 372a, 372b extend fully around the nozzles 360a, 360b, 364a, 364b. In the first configuration 368 (FIG. 27), the angular positions of the lobes 372a and secondary chevrons 366a are such that the keels 374a of the lobes 372a are aligned with valleys 376a of the secondary chevrons 366a (keel-to-valley). Further, the crowns 378a of the lobes 372a are aligned with tips 380a of the secondary chevrons 366a (crown-to-tip). Solid arrows 382a, pointing outward from the center, also indicate the locations of valleys for chevrons and crowns for the mixer, while dashed arrows 384a, pointing inward toward the center, indicate the locations of tips for the chevrons and keels for the mixer.

The second configuration 370, in FIG. 28, is a configuration of the angular positions of the lobes 368b and secondary chevrons 366b with the crowns 378b of the lobes 372b aligned with valleys 376b of the secondary chevrons 366b (crown-to-valley). Further, the keels 374b of the lobes 368b are aligned with tips 380b of the secondary chevrons 366b (keel-to-tip). As with the use of the primary and secondary chevrons 332b, 336b of FIG. 26, this results in high frequency noise emitted from the lobes 368b and the secondary chevrons 366b being in an additive relationship, and low frequency noise emitted from the lobes 368b and the secondary chevrons 366b also being in an additive relationship. Because of the cumulative effect of the aligned crowns 378b with valleys 376b and keels 374b with tips 380b, the low frequency noise reduction increases (generally beneficial) and the high frequency lift increases (beneficial when shielding is provided, as in, but not limited to, aircraft 70 and aircraft 150 described herein). The configurations 368, 370 of FIGS. 27 and 28 are also applicable to when there is a one-to-one ratio of lobes and secondary chevrons as shown, but may also be applicable when the lobe count divides evenly into the secondary chevron count, or when the secondary chevron count divides evenly into the lobe count.

It should be understood that the cumulative effect of combining high frequency lift from the primary chevrons 332b and secondary chevrons 336b in FIG. 26 and of combining high frequency lift from the lobes 368b and the secondary chevrons 366b in FIG. 28 is generally contrary to the approach that would be taken without noise shielding barriers available, such as the barriers presented by the aircraft 70, 150 described herein, given that the additive increase in high frequency noise would generally fully counteract the additive low frequency reduction and result in an EPNL penalty.

Figure 29:
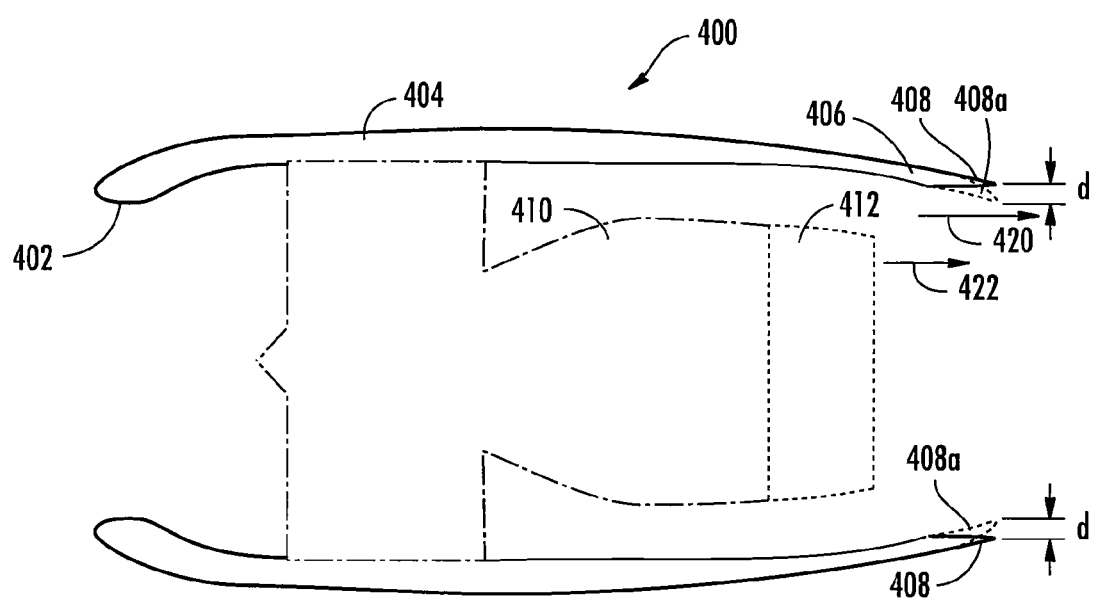
FIG. 29 is a simplified side profile view of a nacelle showing deformable chevrons.

As shown in FIG. 29, a simplified view of a nacelle 400 is shown that may be, for example, any of nacelles 200, 202, 204. The profile of the fan inlet 402, fan cowl 404, fan nozzle 406, and chevrons 408 are shown, and an engine 410 with a core nozzle 412 that may have primary chevrons or a mixer associated with it (not shown) is also provided. Fan flow 420 and core flow 422 is generated by the engine 410. The chevrons 408 are deformable components that make up variable geometry chevrons. Although not shown, primary chevrons at the core nozzle 412 may also be provided that are variable geometry chevrons.

Variable geometry chevrons are described in detail in U.S. Pat. No. 6,718,752, issued Apr. 13, 2004 and entitled "Deployable Segmented Exhaust Nozzle for a Jet Engine," and U.S. patent application Ser. No. 12/537,002, filed Aug. 6, 2009 and entitled "High Stiffness Shape Memory Alloy Actuated Aerostructure," the contents of both of which are incorporated herein by reference in their entirety.

The chevrons 408 may be shape memory alloy and change shape with change in temperature, or be actuated by other means, as previously discussed. If a shape memory alloy is used, when the aircraft is on the ground in relatively warm temperatures, the chevron tips 408 are immersed in the fan nozzle flow to be in the position of chevrons 408a. At cruising altitude, where the temperature is much colder, the chevron tips come out of the fan flow 420. The immersion distance d of the chevrons 408, 408a for conventional aircraft might be expected to be between 0.5 and 1.0 inches, and in some cases up to 1.5 inches, but when used with an aircraft 70, 150 with shielding as described herein, the immersion could be up to, for example, approximately 2 inches. Typically chevron designs, which mitigate low frequency noise and are used for that purpose, increase high frequency noise, which is unacceptable at some level in conventional aircraft. Creation of high frequency noise is a function of the depth of immersion into the fan nozzle or core nozzle flow. Because chevrons increase high frequency noise, and cause thrust losses in the nacelle, they may be considered undesirable and discarded even if they show large decreases in low frequency noise.

Variable geometry chevrons may be used to immerse the tip further than with fixed chevrons during take-off, landing, and climb-out, to purposely increase the high frequency noise and obtain large low frequency noise reductions, and then use noise shielding technology of the aircraft 70, which is highly effective for high frequency noise, to mitigate the high frequency noise. Variable geometry chevrons are preferably only in a position of deepest immersion when the aircraft is at 4,000 feet altitude or lower. For low bypass ratio engines (for example, less than about 3) where climb-to-cruise noise can be an issue it is preferable that the immersion be reduced gradually until the aircraft reaches approximately 10,000 feet above the nearest ground to provide noise mitigation during the climb to cruise segment of the mission.

Figure 30:
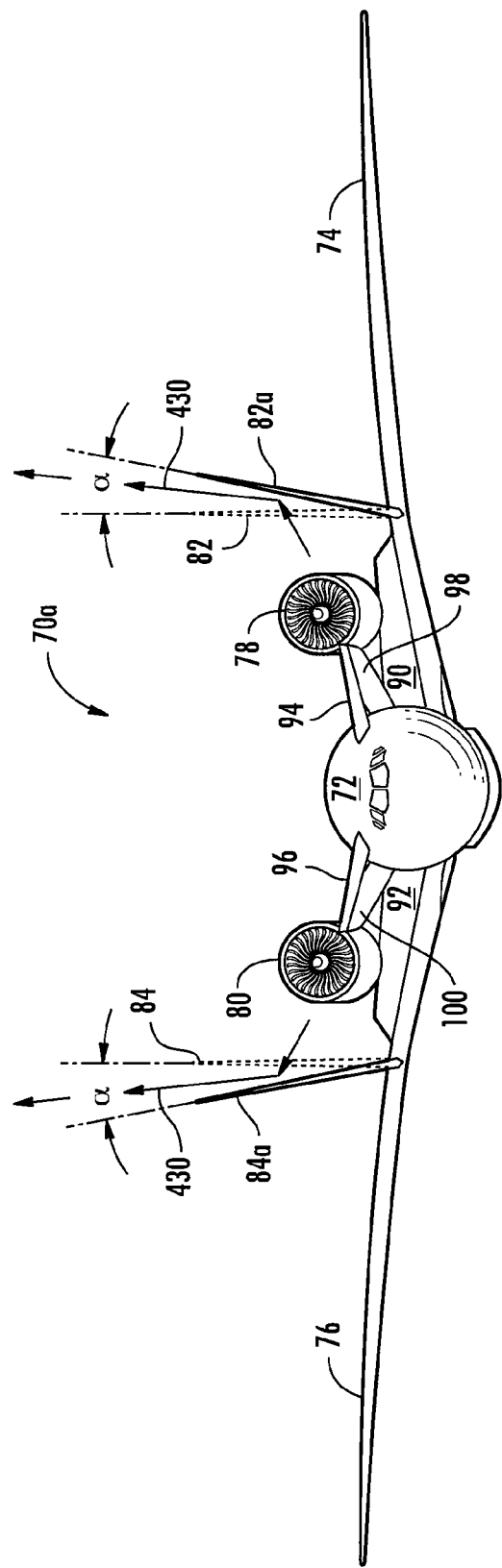
FIG. 30 is a front elevation view of another embodiment airplane.

FIG. 30 shows another embodiment of an aircraft 70a. In this embodiment, the vertical stabilizers 82, 84 are canted outward off of vertical to be canted stabilizers 82a, 84a. "Substantially vertical stabilizers" may be understood to be either vertical stabilizers 82, 84 or canted vertical stabilizers 82a, 84a. The effect of canted stabilizers 82a, 84a is to direct reflected noise and heat 430 from the engines 78, 80 upward. The angle $\alpha$ of cant may be, for example, between approximately 5 and 10 degrees, and preferably approximately 10 degrees.

Specific embodiments of an invention are described herein. One of ordinary skill in the aerospace field will recognize that the invention may be applied in a variety of aircraft designs. In fact, many embodiments and implementations are possible. This application is intended to cover any adaptations or variations of the present invention. The following claims are in no way intended to limit the scope of the invention to the specific embodiments described.

What is claimed is:

1. A non-blended wing body aircraft comprising:
a tubular fuselage;
two wings with two wing strakes mounted to the tubular fuselage, the wings and strakes in a substantially delta wing configuration and each including a leading edge and a top surface, the wings each including a trailing edge;
a plurality of nacelles mounted to the fuselage and having a leading end, a top, a bottom, and a longitudinal axis, each nacelle including a turbofan engine, a fan nozzle having a diameter, and a core nozzle, wherein each nacelle is completely and directly above the respective wing, strake, or a combination thereof;
a substantially vertical stabilizer mounted on each wing outboard of each respective outermost nacelle at a mounting location;
a split aft deck including a trailing edge and a multi-element upwardly rotatable pitch control surface including a trailing edge at the trailing edge of the deck, and
noise shifting means associated with the core nozzle, the fan nozzle, or a combination thereof, of each nacelle,
wherein the mounting location of each substantially vertical stabilizer to the respective wing is lower than the bottom of the respective outermost nacelle and each substantially vertical stabilizer extends at least as high as the top of the respective outermost nacelle,
wherein the leading edge of each strake or wing, as applicable, extends forward of the respective nacelle leading end along the longitudinal axis of that nacelle at least a distance as great as the distance from the top surface of the respective wing to the top of the respective nacelle,
wherein the trailing edge of the aft deck extends aft of the respective nacelle fan nozzle along the longitudinal axis of that nacelle at least a distance as great as the distance from the top surface of the respective wing to the top of the respective nacelle,
wherein the fuselage extends between the nacelles and there is no central vertical stabilizer between the nacelles.

2. The aircraft of claim 1, wherein the noise shifting means includes variable geometry chevrons as primary chevrons at the core nozzle, variable geometry chevrons as secondary chevrons at the fan nozzle, or a combination thereof, wherein the variable geometry chevrons each include a free end with a tip, and wherein the tips of the variable geometry chevrons have a fully immersed position towards the longitudinal axis of the nacelle of between approximately 1.5 inches to approximately 2 inches from the fan nozzle.

3. The aircraft of claim 1, wherein the noise shifting means comprises chevrons mounted to or integrated with the core nozzle.

4. The aircraft of claim 1, wherein the noise shifting means comprises a partial bypass mixer at the core nozzle.

5. The aircraft of claim 1, wherein the noise shifting means comprises a long duct full flow mixer at the core nozzle.

6. The aircraft of claim 1, wherein the distance from the fan nozzle to the trailing end of the upwardly rotatable pitch control surface, when the upwardly rotatable pitch control surface is in the same plane as the aft deck, is greater than approximately two fan nozzle diameters.

7. The aircraft of claim 1, wherein the noise shifting means comprise primary chevrons at the core nozzle and secondary chevrons at the fan nozzle, wherein the angular orientation of the primary chevrons and the secondary chevrons is such that the tips of more than one primary chevron are aligned with the tips of more than one secondary chevron, and the valleys of more than one primary chevron are aligned with the valleys of more than one secondary chevron.

8. The aircraft of claim 1, wherein the noise shifting means comprise a lobed mixer at the core nozzle and secondary chevrons at the fan nozzle, wherein the angular orientation of the lobes of the mixer and the secondary chevrons is such that the tips of more than one lobe are aligned with the tips of more than one secondary chevron, and the valleys of more than one primary chevron are aligned with the valleys of more than one secondary chevron.

9. The aircraft of claim 1, wherein the substantially vertical stabilizers are canted outboard by approximately 5 degrees to approximately 10 degrees off of a plane perpendicular with the top surface of the aft deck.

10. The aircraft of claim 1, wherein the noise shifting means comprises secondary chevrons mounted to or integrated with the fan nozzle.

11. The aircraft of claim 10, wherein the secondary chevrons are un-actuated, fixed position chevrons.

12. The aircraft of claim 10, wherein the secondary chevrons are variable geometry chevrons.

13. The aircraft of claim 1, wherein the noise shifting means includes variable geometry chevrons as primary chevrons at the core nozzle, variable geometry chevrons as secondary chevrons at the fan nozzle, or a combination thereof, wherein the variable geometry chevrons each include a free end with a tip, and wherein the tips of the variable geometry chevrons have a fully immersed position towards the longitudinal axis of the nacelle of up to approximately 2 inches from the fan nozzle.

14. The aircraft of claim 13, wherein the deepest immersion of variable geometry chevrons towards the longitudinal axis occurs at approximately 4,000 feet altitude or lower.

15. The aircraft of claim 13, wherein the immersion is eliminated gradually from take-off to when the aircraft is approximately 10,000 feet above nearest ground.

16. The aircraft of claim 1, wherein the distance from the fan nozzle to the trailing end of the upwardly rotatable pitch control surface, when the upwardly rotatable pitch control surface is in the same plane as the aft deck, is between approximately two and a half and approximately three and a half fan nozzle diameters.

17. The aircraft of claim 16, wherein shielding of noise emitted towards the ground from the aircraft in flight for frequency bands 33 and higher results in approximately 10 db or more attenuation.

18. A method of making a non-blended wing body aircraft with reduced aircraft noise, infrared radiation, or sonic boom, or a combination thereof, emitted towards the ground from the aircraft in flight, the method comprising:
providing a tubular fuselage;
mounting two wings with two wing strakes to the fuselage, the wings and strakes in a substantially delta wing configuration and each including a leading edge and a top surface, the wings each including a trailing edge;
mounting a plurality of nacelles to the fuselage and having a leading end, a top, a bottom, and a longitudinal axis, each nacelle including a turbofan engine, a fan nozzle having a diameter, and a core nozzle, wherein each nacelle is completely and directly above the respective wing, strake, or a combination thereof;
mounting a substantially vertical stabilizer on each wing outboard of each respective outermost nacelle at a mounting location;
providing a split aft deck including a trailing edge and a multi-element upwardly rotatable pitch control surface including a trailing edge at the trailing edge of the deck, and
providing noise shifting means for each nacelle primary comprising one or more of chevrons at the core nozzle, secondary chevrons at the fan nozzle, a partial bypass mixer at the core nozzle, a long duct full flow mixer at the core nozzle, or a combination thereof,
wherein the mounting location of each substantially vertical stabilizer to the respective wing is lower than the bottom of the respective outermost nacelle and each substantially vertical stabilizer extends at least as high as the top of the respective outermost nacelle,
wherein the leading edge of each strake or wing, as applicable, extends forward of the respective nacelle leading end along the longitudinal axis of that nacelle at least a distance as great as the distance from the top surface of the respective wing to the top of the respective nacelle,
wherein the trailing edge of the aft deck extends aft of the respective nacelle fan nozzle along the longitudinal axis of that nacelle at least a distance as great as the distance from the top surface of the respective wing to the top of the respective nacelle,
wherein the fuselage extends between the nacelles and there is no central vertical stabilizer between the nacelles.

19. A method of shielding noise emitted toward the ground from a non-blended wing body aircraft in flight by nacelles, each nacelle having a longitudinal axis and including a turbofan engine, a fan nozzle having a diameter, and a core nozzle, the aircraft including aerodynamic structural surfaces, the method comprising:
using noise shifting means associated with the fan nozzle, the core nozzle, or a combination thereof, to cause an increase in high frequency noise and a decrease in low frequency noise; and
using the aerodynamic structural surfaces as a noise shielding barrier between the nacelles and the ground, wherein the barrier has a trailing end that extends aft of the fan nozzle between approximately two and approximately four fan nozzle diameters from the fan nozzle along the nacelle longitudinal axis.

20. The method of claim 19, wherein the barrier trailing end extends aft of the fan nozzle between approximately 2.5 and approximately 3.5 fan nozzle diameters to result in, beneath the aircraft, sound attenuation for frequency bands 33 and higher of at least approximately 10 dB.

\* \* \* \* \*